(12) United States Patent
Zhu et al.

(10) Patent No.: US 12,075,329 B2
(45) Date of Patent: Aug. 27, 2024

(54) DATA SENDING METHOD AND COMMUNICATION APPARATUS

(71) Applicant: HUAWEI TECHNOLOGIES CO., LTD., Shenzhen (CN)

(72) Inventors: Huiying Zhu, Shanghai (CN); Pengpeng Dong, Shanghai (CN); Shengyue Dou, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 17/506,103

(22) Filed: Oct. 20, 2021

(65) Prior Publication Data

US 2022/0038991 A1 Feb. 3, 2022

Related U.S. Application Data

(63) Continuation of application No. PCT/CN2020/085350, filed on Apr. 17, 2020.

(30) Foreign Application Priority Data

Apr. 22, 2019 (CN) .......................... 201910325246.9

(51) Int. Cl.
*H04W 40/12* (2009.01)
*H04B 17/318* (2015.01)
(Continued)

(52) U.S. Cl.
CPC ........ *H04W 40/125* (2013.01); *H04B 17/318* (2015.01); *H04L 1/0026* (2013.01); *H04W 24/10* (2013.01); *H04W 40/16* (2013.01)

(58) Field of Classification Search
CPC ... H04W 40/125; H04W 24/10; H04W 40/16; H04B 17/318; H04L 1/0026
(Continued)

(56) References Cited

U.S. PATENT DOCUMENTS 10,171,150 B1 * 1/2019 Marupaduga .......... H04B 7/043
2009/0122747 A1 5/2009 In et al.
(Continued)

FOREIGN PATENT DOCUMENTS

CN 102026299 A 4/2011
CN 103415056 A 11/2013
(Continued)

OTHER PUBLICATIONS

Chi Zhang WO 2017067503 A1 Resource Indication Method, Device and System Apr. 27, 2017.*
(Continued)

*Primary Examiner* — Nghi H Ly
(74) *Attorney, Agent, or Firm* — Rimon PC

(57) ABSTRACT

This application provides a data sending method and a communication apparatus. The method includes: A first node determines, based on a quality of a channel between the first node and a second node, a sending time for starting to send data, where the first node is one of several candidate previous-hop nodes of the second node. The first node starts to send the data to the second node at the sending time. According to the data sending method, when a node needs to send data to a next-hop node of the node, the node may determine, based on quality of a channel between the node and the next-hop node of the node, a sending time for starting to send the data.

20 Claims, 12 Drawing Sheets

(51) Int. Cl.
*H04L 1/00* (2006.01)
*H04W 24/10* (2009.01)
*H04W 40/16* (2009.01)

(58) Field of Classification Search
USPC ............... 370/329, 328, 338, 341, 345, 350
See application file for complete search history.

(56) References Cited

U.S. PATENT DOCUMENTS

2015/0327180 A1* 11/2015 Ryu ..................... H04L 1/0009
370/329
2017/0273031 A1   9/2017 Tabet et al.

FOREIGN PATENT DOCUMENTS

| CN | 105049356 A | 11/2015 | | |
| CN | 105610485 A | 5/2016 | | |
| CN | 106230545 A | 12/2016 | | |
| CN | 106658718 A | 5/2017 | | |
| JP | 2015043546 A | 3/2015 | | |
| KR | 20060079516 A | * | 7/2006 | ........ H04W 36/0055 |

OTHER PUBLICATIONS

3GPP TS 38.214 V15.5.0 (Mar. 2019), 3rd Generation Partnership Project; Technical Specification Group Radio Access Network; NR; Physical layer procedures for data(Release 15), 103 pages.
3GPP TS 36.213 V15.5.0 (Mar. 2019), 3rd Generation Partnership Project; Technical Specification Group Radio Access Network; Evolved Universal Terrestrial Radio Access (E-UTRA); Physical layer procedures(Release 15), 552 pages.
Lynn N et al: "Cooperative ARQ using distributed relay selection and inter-relay opportunistic listening", Sep. 26, 2010 (Sep. 26, 2010), pp. 467-472, XP031837189.
Jacek G ra et al: "3GPP Mobile Communications: L TE/SAE and L TE-A : Engineering Guidelines for Fixed, Mobile and Satellite Systems" In: "The Telecommunications Handbook: Engineering Guidelines for Fixed, Mobile and Satellite Systems", Feb. 16, 2015 (Feb. 16, 2015), John Wiley and Sons, Ltd, Chichester, UK, XP055588144, ISBN: 978-1-119-94488-1 pp. 417-514,.

* cited by examiner

300

```
┌─────────────────────────────────────────────────────────────┐
│ Determine, based on quality of a channel between a first node and a │
│ second node, sending time for starting to send data, where the first │ ~ S310
│    node is one of candidate previous-hop nodes of the second node   │
└─────────────────────────────────────────────────────────────┘
                              │
┌─────────────────────────────────────────────────────────────┐
│   Perform measurement on a second time domain resource, where       │
│ end time of the second time domain resource is earlier than or equal │ ~ S319
│                      to the sending time                            │
└─────────────────────────────────────────────────────────────┘
                              │
┌─────────────────────────────────────────────────────────────┐
│  When a result of the measurement performed by the first node on    │
│   the second time domain resource does not meet a first condition,  │ ~ S320
│           determine not to send the data to the second node         │
└─────────────────────────────────────────────────────────────┘
```

FIG. 9

DATA SENDING METHOD AND COMMUNICATION APPARATUS

CROSS-REFERENCE TO RELATED APPLICATIONS

This application is a continuation of International Application No. PCT/CN2020/085350, filed on Apr. 17, 2020, which claims priority to Chinese Patent Application No. 201910325246.9, filed on Apr. 22, 2019. The disclosures of the aforementioned applications are hereby incorporated by reference in their entireties.

TECHNICAL FIELD

This application relates to the communication field, and more specifically, to a data sending method and a communication apparatus.

BACKGROUND

In a cooperative communication scenario, data of a source node may be received and processed by one or more cooperative forwarding nodes, and then forwarded to a target node. The target node then combines the received data by using a combination technology, to obtain diversity gains. In this way, the transmission reliability can be improved or a coverage area of a system can be increased. The one or more cooperative forwarding nodes may alternatively send, to the target node through links between the one or more cooperative forwarding nodes and the target node, data that needs to be sent by the one or more cooperative forwarding nodes to the target node. Currently, when a cooperative forwarding node needs to send data, a time domain resource used by the cooperative forwarding node to send the data is preconfigured or predefined, but the cooperative forwarding node cannot determine a sending time of the data, thus causing low data sending reliability. In addition, when a plurality of cooperative forwarding nodes send a same data block to the target node, the plurality of cooperative forwarding nodes send the data block to the target node at the same time. This causes redundant transmission of the same data block, causing a waste of power and a waste of channel resources of the cooperative forwarding nodes, which seriously affects the communication efficiency.

SUMMARY

This application provides a data sending method and a communication apparatus, so that a node can flexibly determine a sending time of data, and sending times of data on different nodes are differentiated, thereby avoiding a waste of power of the node.

According to a first aspect, a data sending method is provided. The method may be performed by a first node, or may be performed by a chip, a chip system, a processor, or the like used in the first node. For example, the first node performs the method. The method includes: The first node determines, based on a quality of a channel between the first node and a second node, a sending time for starting to send data, where the first node is one of several candidate previous-hop nodes of the second node. The first node starts to send the data to the second node at the sending time.

According to the data sending method provided in the first aspect, when a node needs to send data to a next-hop node of the node, the node may determine, based on a quality of a channel between the node and the next-hop node of the node, a sending time for starting to send the data. In this way, the node can flexibly determine the sending time of the data, and sending times of data on different nodes are differentiated, thereby avoiding a waste of power of the node, and improving the channel resource utilization efficiency. In addition, the sending time of the data is related to the quality of the channel for sending the data, so that the reliability of sending the data can be improved.

In a possible implementation of the first aspect, there is a correspondence between the quality of the channel and the sending time. In this implementation, the sending time of the data is determined by using the correspondence between the quality of the channel between the first node and the second node and the sending time and with reference to the quality of the channel between the first node and the second node, so that the determined sending time of the data may be relatively accurate, and it is easy to determine the sending time of the data. The complexity of determining the sending time of the data is reduced, and resources are saved.

In a possible implementation of the first aspect, there is a correspondence between the quality of the channel and a time domain offset value, and the time domain offset value indicates a time domain offset between start time of a first reference time domain resource and the sending time; and that the first node determines, based on the quality of a channel, the sending time includes: The first node determines the time domain offset value based on the quality of the channel; and the first node determines the sending time based on the time domain offset value and the reference time domain resource. In this implementation, the sending time of the data is determined by using the correspondence between the quality of the channel between the first node and the second node and the time domain offset value and with reference to the quality of the channel between the first node and the second node and the first reference time domain resource, so that the determined sending time of the data may be relatively accurate. The flexibility of determining the sending time is improved. In a possible implementation of the first aspect, there is a correspondence between the quality of the channel and a first time domain resource used to send the data; and that the first node determines, based on the quality of the channel, the sending time includes: The first node determines the first time domain resource based on the quality of the channel, where start time of the first time domain resource is the sending time. In this implementation, it is easy to determine the sending time of the data by using the correspondence between the quality of the channel between the first node and the second node and the time domain resource used to send the data, and with reference to the quality of the channel between the first node and the second node. The complexity of determining the sending time of the data is reduced, and resources are saved.

In a possible implementation of the first aspect, that the first node determines, based on the quality of the channel, the sending time includes: The first node determines a duration of a timer based on the quality of the channel, where there is a correspondence between the duration of the timer and the quality of the channel; and the first node enables the timer at a first time, and determines the sending time based on the duration of the timer.

In a possible implementation of the first aspect, the method further includes: The first node performs measurement on a second time domain resource, where an end time of the second time domain resource is earlier than or equal to the sending time. Optionally, a start time of the second time domain resource is a start time of a second reference time domain resource. Optionally, the end time of the second time domain resource is the sending time.

In a possible implementation of the first aspect, that the first node starts to send the data to the second node at the sending time includes: When a result of the measurement on the second time domain resource meets a first condition, the first node starts to send the data to the second node at the sending time. In this implementation, the first node may detect, before the sending time of the data, whether another node is also sending the data. If it is determined that no other node is sending the data, the first node starts to send the data to the second node at the sending time. Thus, redundant transmission of a same data block can be avoided, a waste of power and a waste of channel resources of a node can be avoided, and communication efficiency is improved.

In a possible implementation of the first aspect, the first condition includes: power measured on the second time domain resource is less than or equal to a first threshold, a received signal strength indicator (RSSI) measured on the second time domain resource is less than or equal to a second threshold, RSRQ measured on the second time domain resource is less than or equal to a third threshold, and/or NACK information is detected on the second time domain resource.

In a possible implementation of the first aspect, the first reference time domain resource is predefined, may be configured by a control node by using higher layer signaling, or may be indicated by the control node by using physical layer signaling. The higher layer signaling may include, for example, RRC, MAC CE, and RLC signaling, and the physical layer signaling may include, for example, DCI.

In a possible implementation of the first aspect, the second reference time domain resource is predefined, may be configured by the control node by using higher layer signaling, or may be indicated by the control node by using physical layer signaling. The higher layer signaling may include, for example, RRC, MAC CE, and RLC signaling, and the physical layer signaling may include, for example, DCI.

In a possible implementation of the first aspect, the method further includes: The first node receives the data from a third node, where the first node is one of several candidate next-hop nodes of the third node.

In a possible implementation of the first aspect, the quality of the channel is one or more of the following:

a signal-to-noise ratio (SNR), a value interval of the SNR, a signal to interference plus noise ratio (SINR), a value interval of the SINR, a channel quality indicator (CQI), a value interval of the CQI, a received signal strength indicator (RSSI), a value interval of the RSSI, a reference signal received power (RSRP), or a value interval of the RSRP.

According to a second aspect, a data sending method is provided. The method may be performed by a control node, or may be performed by a chip, a chip system, a processor, or the like used in the control node. For example, the control node performs the method. The method includes the following steps:

The control node generates configuration information, where the configuration information is used by a first node to determine sending time for starting to send data to a second node, and the first node is one of several candidate previous-hop nodes of the second node. The control node sends the configuration information to the first node. The control node is a source node, or is one of several candidate previous-hop nodes of the first node, or a network-side centralized controller.

According to the data sending method provided in the second aspect, the control node may notify the first node of the configuration information used by the first node to determine the sending time for starting to send the data to the second node. After receiving the configuration information, the first node determines, with reference to the quality of the channel between the first node and the second node, the sending time for starting to send the data. The accuracy and efficiency of determining the sending time by the first node can be improved. A waste of power and a waste of channel resources of the first node are avoided, and the communication efficiency is improved.

In a possible implementation of the second aspect, the configuration information includes a correspondence between the quality of the channel and the sending time.

In a possible implementation of the second aspect, the configuration information includes a correspondence between the quality of the channel and a time domain offset value, and the time domain offset value indicates a time domain offset between a start time of a first reference time domain resource and the sending time.

In a possible implementation of the second aspect, the configuration information includes a correspondence between the quality of the channel and a first time domain resource used to send the data.

In a possible implementation of the second aspect, the configuration information includes a correspondence between duration of a timer and the quality of the channel.

In a possible implementation of the second aspect, the configuration information further includes time domain information of the first reference time domain resource.

In a possible implementation of the second aspect, the configuration information further includes time domain information of a second reference time domain resource.

In a possible implementation of the second aspect, the configuration information may further include a first condition. The first condition includes one or more of: transmit power measured on a second time domain resource is less than or equal to a first threshold, an RSSI measured on the second time domain resource is less than or equal to a second threshold, RSRQ measured on the second time domain resource is less than or equal to a third threshold, NACK information is detected on the second time domain resource, or an indication signal that indicates to another node not to send the data that is received on the second time domain resource.

In a possible implementation of the second aspect, the configuration information may further include a channel quality parameter used to represent the quality of the channel. The channel quality parameter may be one or more of the following:

an SNR of the channel between the first node and the second node, a value interval of the SNR, an SINR of the channel between the first node and the second node, a value interval of the SINR, a CQI of the channel between the first node and the second node, a value interval of the CQI, an RSSI of the channel between the first node and the second node, a value interval of the RSSI, an RSRP of the channel between the first node and the second node, or a value interval of the RSRP.

In a possible implementation of the second aspect, the configuration information is higher layer signaling sent by the control node to the first node, or may be physical layer signaling sent by the control node to the first node. The higher layer signaling may include, for example, RRC, MAC CE, and RLC signaling, and the physical layer signaling may include, for example, DCI.

According to a third aspect, an apparatus is provided. The apparatus is configured to perform the method in any one of the foregoing aspects or the possible implementations of the foregoing aspects. Specifically, the apparatus includes units configured to perform the method in any one of the foregoing aspects or the possible implementations of the foregoing aspects.

According to a fourth aspect, an apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control a receiver to receive a signal and control a transmitter to send a signal. When the processor executes the instructions stored in the memory, the execution enables the processor to perform the method in any one of the foregoing aspects or the possible implementations of the foregoing aspects.

According to a fifth aspect, a computer program product is provided. The computer program product includes computer program code, and when the computer program code is run by a computing device, the computing device is enabled to perform the method in any one of the foregoing aspects or the possible implementations of the aspects.

According to a sixth aspect, a computer-readable medium is provided. The computer-readable medium is configured to store a computer program. The computer program includes instructions used to perform the method in any one of the foregoing aspects or the possible implementations of the foregoing aspects.

According to a seventh aspect, a chip is provided. The chip includes a processor, configured to invoke a computer program from a memory and run the computer program, to enable an apparatus on which the chip is installed to perform the method according to any one of the foregoing aspects or the possible implementations of the foregoing aspects.

According to an eighth aspect, a communication system is provided. The communication system includes the apparatus provided in the third aspect and/or the fourth aspect.

BRIEF DESCRIPTION OF DRAWINGS

FIG. 9 is a schematic flowchart of a data sending method according to another embodiment of this application;

DESCRIPTION OF EMBODIMENTS

Figure 1:
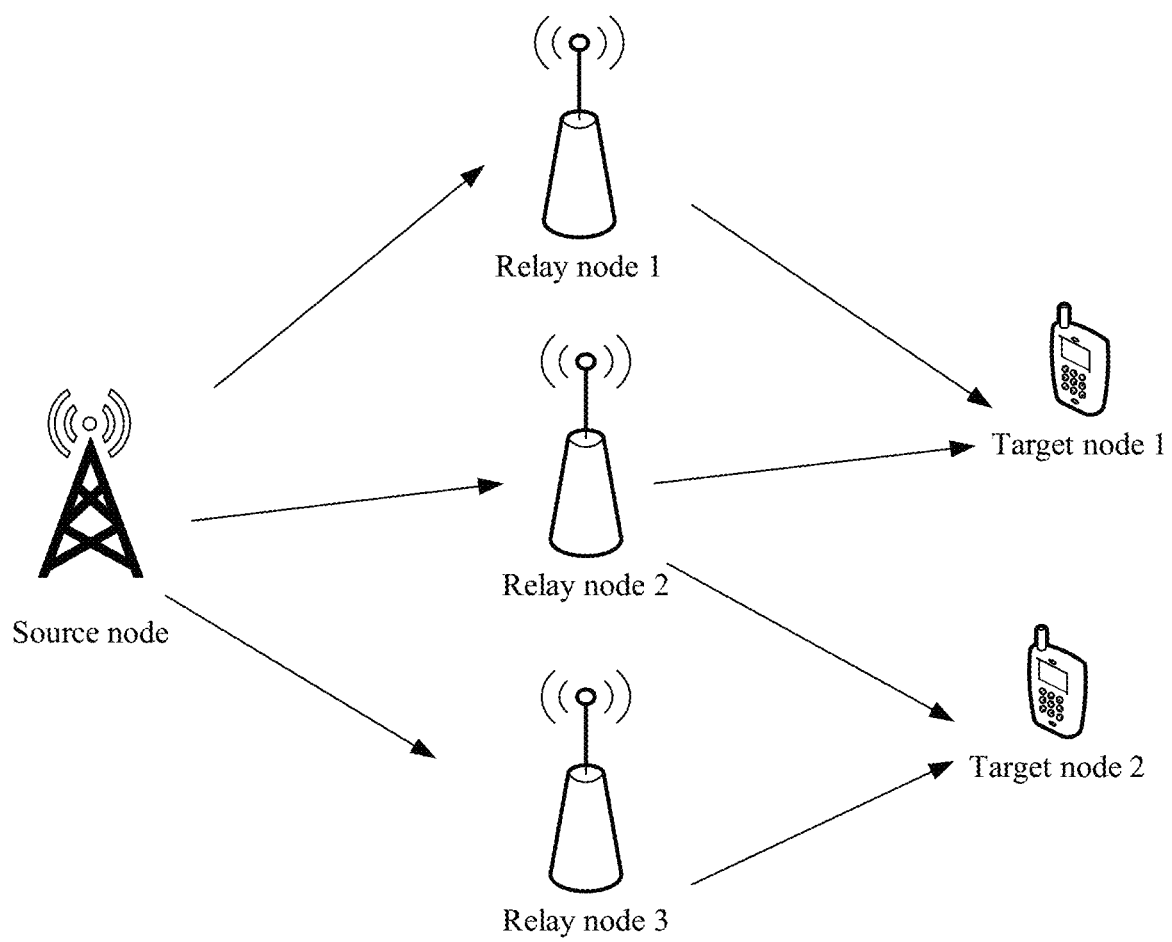
FIG. 1 is a schematic diagram of a structure of a possible network architecture applicable to this application.

The following describes the technical solutions in this application with reference to the accompanying drawings.

The technical solutions of embodiments of this application may be applied to various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, a new radio (NR) system, or a future evolved network.

The terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) system or the code division multiple access (CDMA) system, may be a NodeB (NB) in the wideband code division multiple access (WCDMA) system, may be an evolved NodeB (eNB or eNodeB) in the LTE system, may be a radio controller in a cloud radio access network (CRAN) scenario, or may be a gNodeB (gNB) in NR. Alternatively, the network device may be a relay node, an access point, a vehicle-mounted device, a wearable device, a network device in the future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not particularly limited in the embodiments of this application, provided that communication can be performed according to the method provided in the embodiments of this application by running a program that records code of the method provided in the embodiments of this application. For example, the method provided in the embodiments of this application may be performed by a terminal device or a network device, or a chip, a chip system, or a processor that can support the terminal device or the network device in implementing the method provided in the embodiments of this application, or a functional module that is in a terminal device or a network device and that can invoke a program and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD), a digital versatile disc (DVD)), a smart card, or a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

The rapid development of wireless communication networks has influenced all aspects of people's lives, so that people can quickly access communication networks anytime and anywhere. The wireless communication networks are increasingly becoming an indispensable part of human life. As user service requirements increase and become diversified, mobile users have never stopped pursuing higher-performance wireless communications.

The wireless networks may be classified into a wireless personal area network (WPAN), a wireless local area network (WLAN), a wireless metropolitan area network (WMAN), a wireless wide area network (WWAN), and the like based on a network scale and a coverage area. Since the wireless personal area network represented by a Bluetooth technology has a limited coverage area, devices outside a mutual communication range implement communication through multi-hop forwarding with the use of relay nodes. Poor coverage of the wireless local area network based on wireless fidelity (Wi-Fi) is also a problem that perplexes many users. Development of a conventional Wi-Fi network develops into an existing wireless mesh network (Wi-Fi mesh network) requires a multi-hop technology and a peer-to-peer network to solve coverage issues. As a new public wireless metropolitan area network solution, the wireless mesh network in the wireless metropolitan area network supports a multipoint-to-multipoint mesh structure and adopts a mobile adhoc routing technology, to avoid a single-point failure in a star network. Therefore, all the foregoing networks require a forwarding technology of the relay node to implement a plurality of hops and to expand a coverage area.

In addition, the wireless wide area network is represented by a cellular mobile communication network. To cope with the explosive growth of mobile data traffic, massive device connections, and the constantly emerging various new services and application scenarios in the future, a long term evolution (long term evolution, LTE) system continues to evolve, and a 5th generation (5G) communication system has emerged. In some scenarios with limited coverage, such as dense urban areas, high-frequency small cells, and internet of vehicles (vehicle to everything, V2X), a relay node needs to be introduced between a sending node and a target node to receive data and forward the data, to ensure data transmission integrity. In a current cellular mobile communication system, a mobile terminal cannot be installed with a plurality of antennas for the convenience of portability and due to factors such as a limited size. To better resist multipath fading, a cooperative communication technology appears under the influence of a multiple-input multiple-output (MIMO) technology. From the perspective of signal transmission, a core idea of the cooperative communication technology is to enable single-antenna mobile users who are close to each other to share antennas of each other in a specific manner in a wireless communication environment, so as to perform communication in a cooperative and shared manner. When the relay node is used for cooperative communication, the relay node provides an additional antenna for a mobile user to form spatial diversity to transmit information. A cooperative forwarding technology that combines a forwarding technology and a cooperative communication technology of the relay node includes both relay and diversity technologies, and can resist channel fading, improve the transmission reliability and a transmission rate of a radio link, expand a coverage area of a system, and enhance the robustness of the system. Therefore, with the use of the cooperative forwarding technology, in some scenarios with limited coverage, original information data of a source node may be received, processed, and forwarded by one or more cooperative forwarding nodes, and then the target node combines the received information data by using a combination technology to obtain diversity gains. Therefore, the transmission reliability can be improved or the coverage area of the system can be increased.

The wireless personal area network, the wireless local area network, the wireless metropolitan area network, or the wireless wide area network can employ the cooperative forwarding technology of the relay node to solve the coverage issue.

With reference to the communication system shown in FIG. 1, the following describes how to use a relay node to forward data in a cooperative manner. FIG. 1 is a schematic diagram of a structure of a possible network architecture applicable to this application. As shown in FIG. 1, the system includes a source node, a relay node 1, a relay node 2, a relay node 3, a target node 1, and a target node 2. The source node may be considered as a node that sends data. For example, the source node may be a network device or a terminal device. The target node may be considered as a node that receives data, and the target node may be a network device, a terminal device, or the like. There are a plurality of transmission paths between the source node and the target node 1 and the target node 2. The relay node (also referred to as a cooperative forwarding node) may be a relay device, and is mainly responsible for receiving a wireless signal and forwarding the wireless signal. The relay node may forward data to another relay device, terminal device, or network device, or receive data sent by another relay device, terminal device, or network device. The relay node may alternatively be a relay station, a network device, or a terminal device.

As shown in FIG. 1, the source node may communicate with the target node 1 through the relay node 1 and the relay node 2, and communicate with the target node 2 through the relay node 2 and the relay node 3. In the architecture shown in FIG. 1, the relay node 1, the relay node 2, and the relay node 3 may be considered as candidate next-hop nodes of the source node. For the relay node 1, the target node 1 is a candidate next-hop node of the relay node 1. For the relay node 2, the target node 1 and the target node 2 are candidate next-hop nodes of the relay node 2, or the relay node 2 is a candidate previous-hop node of the target node 1 and the target node 2. Similarly, for the target node 2, the relay node 2 and the relay node 3 are candidate previous-hop nodes of the target node 2. For example, when sending data to the target node 1, the source node may first send the data to the relay node 1 and/or the relay node 2, and then the relay node 1 and/or the relay node 2 may forward the data to the target node 1. Alternatively, when sending data to the target node 2, the source node may first send the data to the relay node 2 and/or the relay node 3, and then the relay node 2 and/or the relay node 3 may separately forward the data to the target node 2. There are a plurality of candidate transmission paths for one source node and one target node. For example, in the example shown in FIG. 1, there are two candidate transmission paths between the source node and the target node 1. The first candidate transmission path is: source node→relay node 1→target node 1, and the second candidate transmission path is: source node→relay node 2→target node 1.

Figure 2:
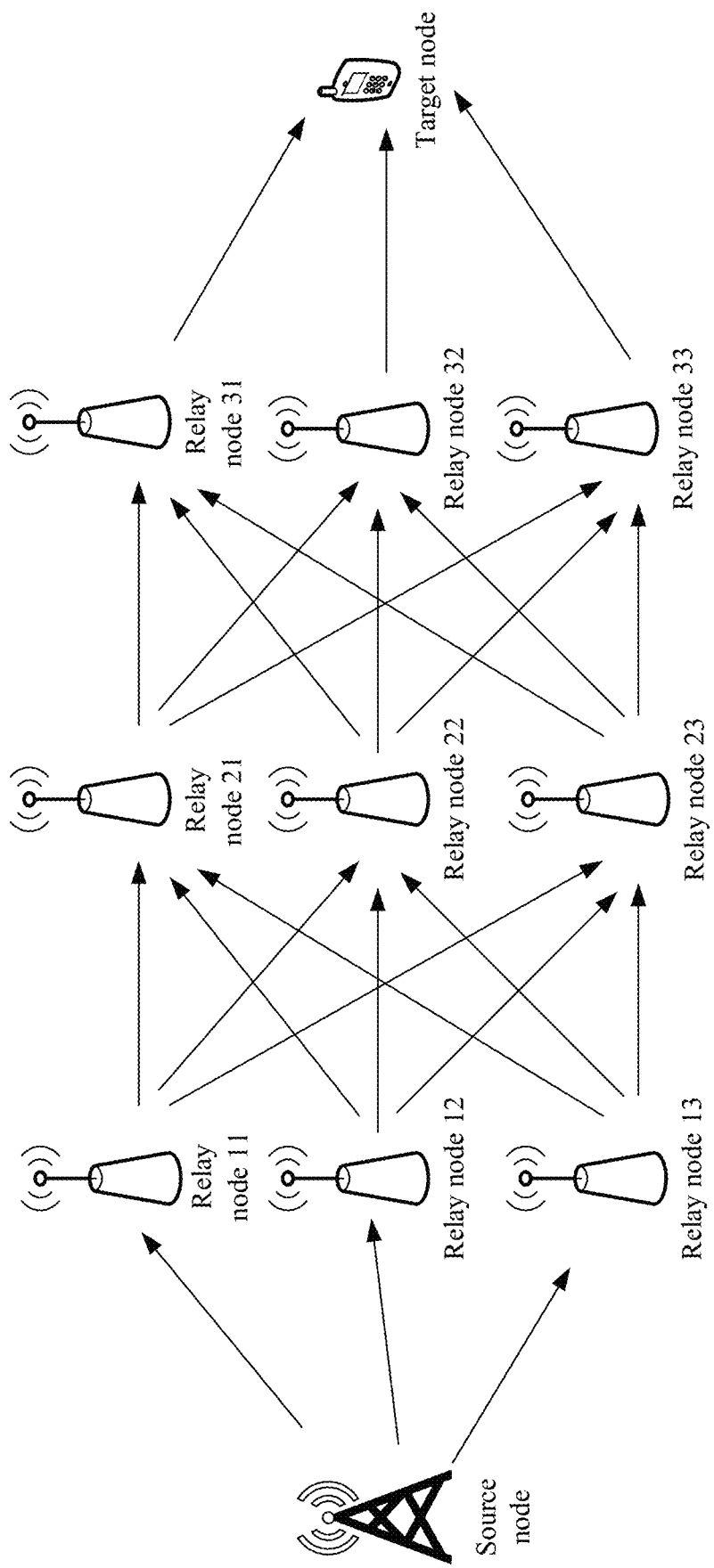
FIG. 2 is a schematic diagram of a structure of another possible network architecture applicable to this application.

It should be understood that FIG. 1 is merely an example, and should not impose a limitation on a network architecture applicable to this application. For example, the network architecture may further include more hops of relay nodes. FIG. 2 is a schematic diagram of another possible network architecture applicable to an embodiment of this application. As shown in FIG. 2, data between a source node and a target node may be transmitted through a plurality of relay nodes. A relay node 11, a relay node 12, and a relay node 13 may be considered as candidate next-hop nodes of the source node. Three relay nodes: a relay node 21, a relay node 22, and a relay node 23, may all be considered as candidate next-hop nodes of the relay node 11, candidate next-hop nodes of the relay node 12, or candidate next-hop nodes of the relay node 13. Similarly, three relay nodes: a relay node 31, a relay node 32, and a relay node 33, may all be considered as candidate next-hop nodes of the relay node 21, candidate next-hop nodes of the relay node 22, or candidate next-hop nodes of the relay node 23. In other words, the three relay nodes: the relay node 21, the relay node 22, and the relay node 23 may all be considered as candidate previous-hop nodes of any one of the three relay nodes: the relay node 31, the relay node 32, and the relay node 33. In the scenario shown in FIG. 2, the data sent by the source node to the target node may be transmitted to the target node through any one or more candidate paths between the source node and the target node. In the network architecture shown in FIG. 2, there are a plurality of candidate transmission paths for one source node and one target node. On the plurality of candidate transmission paths, a node other than the target node may have at least one candidate next-hop node.

In the network architectures shown in FIG. 1 and FIG. 2, the relay node is mainly responsible for receiving and forwarding information, data, and the like. For example, the relay node may forward data to a next-hop relay node, network device, or terminal device, or receive data sent by a previous-hop relay node, network device, or terminal device.

In the network architectures shown in FIG. 1 and FIG. 2, the data forwarded by the relay node may be uplink data, downlink data, sidelink data, or the like. The source node and the target node may be a network device and a terminal device respectively. Alternatively, both the source node and the target node may be network devices. Alternatively, both the source node and the target node may be terminal devices. Alternatively, the source node and the target node may be a relay node and a terminal device respectively. Alternatively, the source node and the target node may be a relay node and a network device respectively. The relay node may alternatively be a relay station, a network device, or a terminal device. Specific structures and forms of the source node, the target node, and the relay node are not limited in this application.

It should be understood that FIG. 1 and FIG. 2 are merely examples, and should not impose a limitation on a network architecture applicable to this application. For example, the network architecture may further include more relay nodes or more hops of relay nodes. This is not limited herein in this application.

Currently, in a scenario in which a relay node performs cooperative forwarding, a data block sent by the source node to the target node may be jointly forwarded by a plurality of relay nodes. The scenario shown in FIG. 1 is used as an example for description. When the source node needs to send data to a target node 1, the source node sends a same data block to a relay node 1 and a relay node 2. When receiving the data block, the relay node 1 and the relay node 2 separately send the data block to the target node 1. Time domain resources used by the relay node 1 and the relay node 2 to send the data block to the target node are the same in the time domain, and the time domain resource is pre-configured or predefined. The relay node 1 and the relay node 2 send the data to the target node on the time domain resource, which means that the relay node 1 and the relay node 2 start to send the data block to the target node at the same time. That is, the sending time at which the relay node 1 and the relay node 2 start to send the data block are the same. Time for starting to send the data block is the start time of the time domain resource. In this case, the relay node 1 and the relay node 2 forward the same data block to the target node at the same time, causing redundant transmission of the same data block. In addition, the relay node 1 and the relay node 2 cannot determine the time domain resource for sending the data. In this case, the reliability of data sending is low, wasting power and wasting channel resources of the relay node.

In view of this, this application provides a data sending method. Each node may determine, based on a quality of a channel, a sending time for the node to send data, so that the node can flexibly determine the sending time of the data, improving data sending reliability. Sending times of data on different nodes are differentiated, thereby avoiding a waste of power of the relay node, and improving the channel resource utilization efficiency.

The data sending method provided in this application may be applied to a plurality of communication scenarios, for example, an integrated access and backhaul (IAB) scenario, a vehicle to everything (V2X) scenario, a high-frequency transmission scenario, an industrial scenario, and a robot-cooperative scenario. A network architecture of the communication scenarios may be shown in FIG. 1 or FIG. 2. The data sent by the node may be uplink data, downlink data, sidelink data, or the like.

Figure 3:
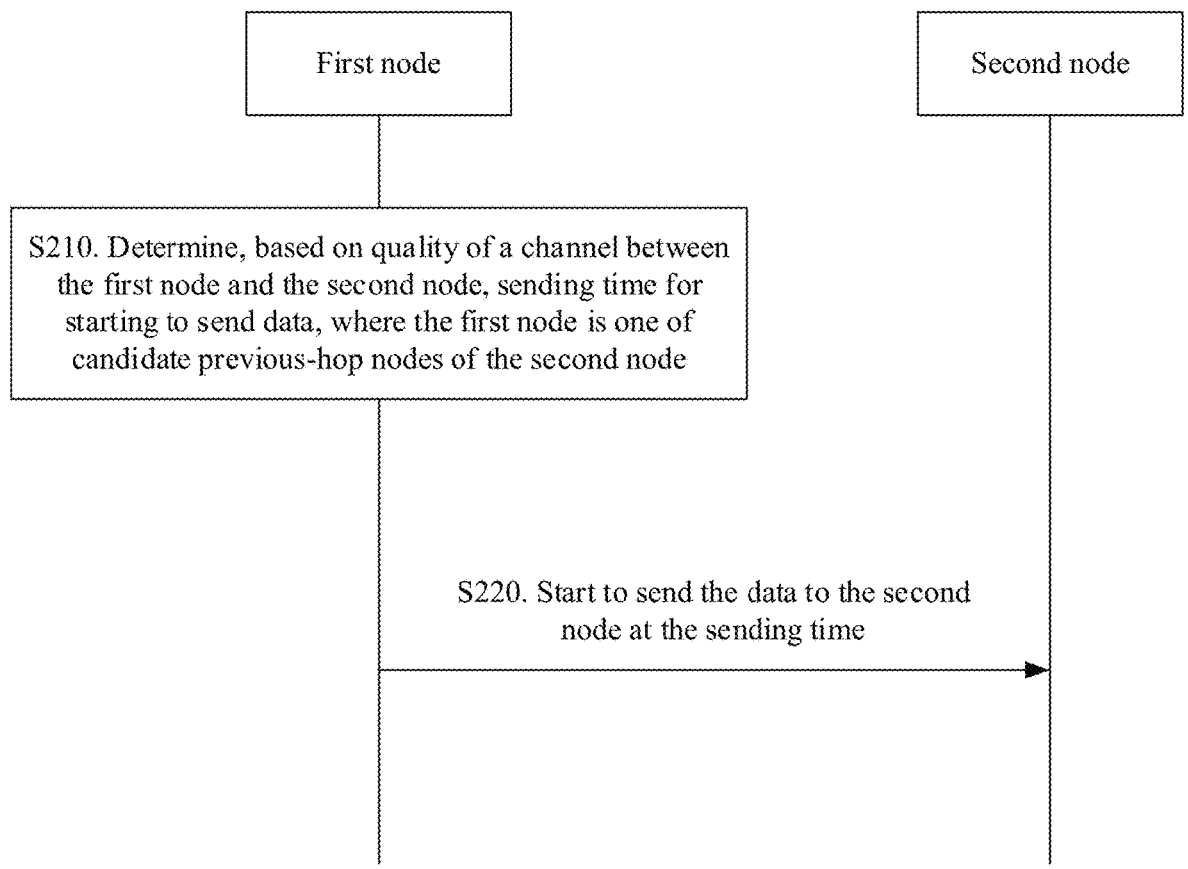
FIG. 3 is a schematic flowchart of a data sending method according to an embodiment of this application.

The following describes in detail the data sending method provided in this application with reference to FIG. 3. FIG. 3 is a schematic flowchart of a data sending method 200 according to an embodiment of this application. The method

200 may be applied to the scenarios shown in FIG. 1 and FIG. 2, and certainly may be applied to another communication scenario. This is not limited herein in this embodiment of this application.

It should be understood that in this embodiment of this application, the method is described by using an example in which a first node performs the method. By way of example and not limitation, the method may alternatively be performed by a chip, a chip system, a processor, or the like used in the first node. The first node may be a relay node, or may be a terminal device or a network device.

The method 200 shown in FIG. 3 may include S210 and S220. The following describes the steps in the method 200 in detail with reference to FIG. 3.

S210. The first node determines, based on a quality of a channel between the first node and a second node, sending time for starting to send data, where the first node is one of several candidate previous-hop nodes of the second node.

S220. The first node starts to send the data to the second node at the sending time.

In S210, when the first node needs to send the data to the second node, the first node needs to determine the sending time for starting to send the data. The sending time may also be referred to as a sending moment. The first node is one of the candidate previous-hop nodes of the second node. The first node may be a source node, or may be a relay node. For example, in the scenario shown in FIG. 1, the first node may be either of the relay node 1 and the relay node 2, and the second node is the target node 1. Alternatively, the first node may be the source node, and the second node may be any one of the relay node 1, the relay node 2, or the relay node 3. For another example, in the scenario shown in FIG. 2, if the first node is any one of the relay node 11, the relay node 12, or the relay node 13, the second node may be any one of the relay node 21, the relay node 22, or the relay node 23.

That the first node sends the data may include two cases: Case 1: If the data is data to be sent by the first node to the second node, the first node may determine, based on the quality of the channel between the first node and the second node, the sending time for starting to send the data. This case may correspond to a case in which the first node is the source node. Case 2: If the data is data that is received by the first node and that is sent by another node (for example, a candidate previous-hop node of the first node) to a target node, and a transmission path between the first node and the second node is one of a plurality of candidate transmission paths of the data, this case may correspond to a case in which the first node is the relay node. For example, the data may be data sent by a third node to the first node, and the first node is one of candidate next-hop nodes of the third node. With reference to the example shown in FIG. 2, if the first node is the relay node 21, the third node is any one of the relay node 11, the relay node 12, and the relay node 13, and the second node is any one of the relay node 31, the relay node 32, and the relay node 33.

When determining the sending time for sending the data to the second node, the first node may determine the sending time of the data based on the quality of the channel between the first node and the second node. The sending time of the data may be understood as a time or a moment for starting to send the data. The data may start to be sent on a time domain resource such as a symbol, a slot, a micro-slot, a mini-slot, a subframe, a half-frame, or a frame, or the data may start to be sent at absolute time. A symbol is also referred to as a time domain symbol, and may be an orthogonal frequency division multiplexing (OFDM) symbol, or may be a single-carrier frequency division multiple access (SC-FDMA) symbol. SC-FDMA is also referred to as orthogonal frequency division multiplexing with transform precoding (OFDM with TP). The absolute time may be understood as the sending time of the data. For example, the sending time of the data may be a $T^{th}$ millisecond.

In S210, the first node may determine, based on the quality of the channel between the first node and the second node, the sending time for starting to send the data. That is, the sending time for starting to send the data is related to the quality of the channel between the first node and the second node. Because different nodes generally correspond to different channel qualities, a sending time that is determined by the different nodes for starting to send the data (for example, a sending time at which the different nodes send a same data block) is also different. In this case, sending times at which the different nodes send the data (for example, the same data block) are differentiated. In S220, after determining the sending time for starting to send the data, the first node starts to send the data to the second node at the sending time.

According to the data sending method provided in this application, when a node needs to send data to a next-hop node of the node, the node may determine, based on a quality of a channel between the node and the next-hop node of the node, a sending time for starting to send the data. In this way, the node can flexibly determine the sending time of the data, and sending times of data on different nodes are differentiated, thereby avoiding a waste of power of the node, and improving the channel resource utilization efficiency. In addition, the sending time of the data is related to the quality of the channel for sending the data, so that the reliability of sending the data can be improved.

It should be understood that, in this embodiment of this application, the first node may alternatively determine, based on another condition in addition to the quality of the channel between the first node and the second node, the sending time for starting to send the data, where the another condition is, for example, a load capability or a load level of the first node, and a data transmission capability or a data transmission level of the first node. This is not limited in this application.

It should be further understood that the first node may determine the quality of the channel in the following several manners: The first node may measure the quality of the channel, the second node may perform measurement and feed back of the quality of the channel to the first node, the second node or the first node may perform measurement and forward the quality of the channel to the first node by using another node, and so on.

In a possible implementation, there is a correspondence between the quality of the channel and the sending time. For example, a correspondence between a channel quality parameter value and the sending time may be predefined or configured, and/or a correspondence between a value interval of a channel quality parameter and the sending time may be predefined or configured. The channel quality parameter value is used to represent the quality of the channel, and the value interval of the channel quality parameter is used to represent a value range of the channel quality parameter value. In S210, the first node may determine, based on the quality of the channel and with reference to the correspondence, the sending time for starting to send the data. Optionally, the correspondence may be predefined, may be configured by a control node by using higher layer signaling, or may be indicated by the control node by using physical layer signaling. The higher layer signaling in this application may include, for example, radio resource control (RRC) signaling, a media access control (MAC) control element (CE), and radio link control (RLC) signaling. The physical layer signaling may include, for example, downlink control information (DCI). The control node may be the source node, or may be one of candidate previous-hop nodes of the first node, or the control node may be a network-side centralized controller. The network-side centralized controller is responsible for controlling sending, receiving, and the like of data on all nodes or some nodes in a network. The first node may determine the corresponding sending time of the data based on the correspondence between the channel quality parameter value and the sending time, or based on the correspondence between the value interval of the channel quality parameter and the sending time. For some or all of the candidate previous-hop nodes of the second node, that is, if there are a plurality of first nodes, some or all of the plurality of first nodes may also determine the corresponding sending time of the data based on the correspondence between the channel quality parameter value and the sending time, or based on the correspondence between the value interval of the channel quality parameter and the sending time. Further, the data sent by the plurality of first nodes to the second node may be a same data block.

Table 1 shows an example of the correspondence between the channel quality parameter value and the sending time. In Table 1, the quality of the channel is represented by using a channel quality indicator (channel quality indicator, CQI). The sending time is represented by using the absolute time, and a unit of the absolute time is a millisecond (ms).

TABLE 1

| CQI index (index) | Sending time (unit: millisecond (ms)) |
|---|---|
| 15 | 13 |
| 14 | 17 |
| 13 | 20 |
| 12 | 25 |
| ... | ... |

For example, the first node may first obtain a CQI between the first node and the second node, determine that the CQI corresponds to a CQI index in Table 1, and then determine sending time based on the correspondence between the CQI index and the sending time shown in Table 1.

Table 2 shows an example of the correspondence between the value interval of the channel quality parameter value and the sending time. In Table 2, the quality of the channel is represented by using a signal-to-noise ratio (signal-to-noise ratio, SNR). The sending time is represented by using the absolute time, and a unit of the absolute time is a millisecond (ms).

TABLE 2

| SNR value interval | Sending time (unit: millisecond (ms)) |
|---|---|
| [25, ∞) | 12 |
| [20, 25) | 16 |
| [15, 20) | 20 |
| [10, 15) | 25 |
| ... | ... |

For example, the first node first obtains an SNR between the first node and the second node, determines that the SNR corresponds to an SNR value interval in Table 2, and then determines a sending time based on the correspondence between the SNR value interval and the sending time.

It should be understood that Table 1 and Table 2 are merely examples, and should not impose any limitation on the correspondence between the quality of the channel and the sending time. For example, the quality of the channel may alternatively be represented by using another channel quality parameter. For example, the quality of the channel may alternatively be represented by a using a signal to interference plus noise ratio (SINR), or reference signal received power (RSRP). This is not limited in this embodiment of this application.

It should be further understood that there may be a one-to-one correspondence between the channel quality parameter value and the sending time. That is, different channel quality parameter values correspond to different sending times. Optionally, there may be a many-to-one correspondence between the channel quality parameter value and the sending time. That is, a plurality of different channel quality parameter values may correspond to same sending time. Similarly, there may be a one-to-one or many-to-one correspondence between the value interval of the channel quality parameter value and the sending time.

The sending time of the data is determined by using the correspondence between the quality of the channel between the first node and the second node and the sending time and with reference to the quality of the channel between the first node and the second node, so that the determined sending time of the data may be relatively accurate, and it is easy to determine the sending time of the data. The complexity of determining the sending time of the data is reduced, and resources are saved.

Figure 4:
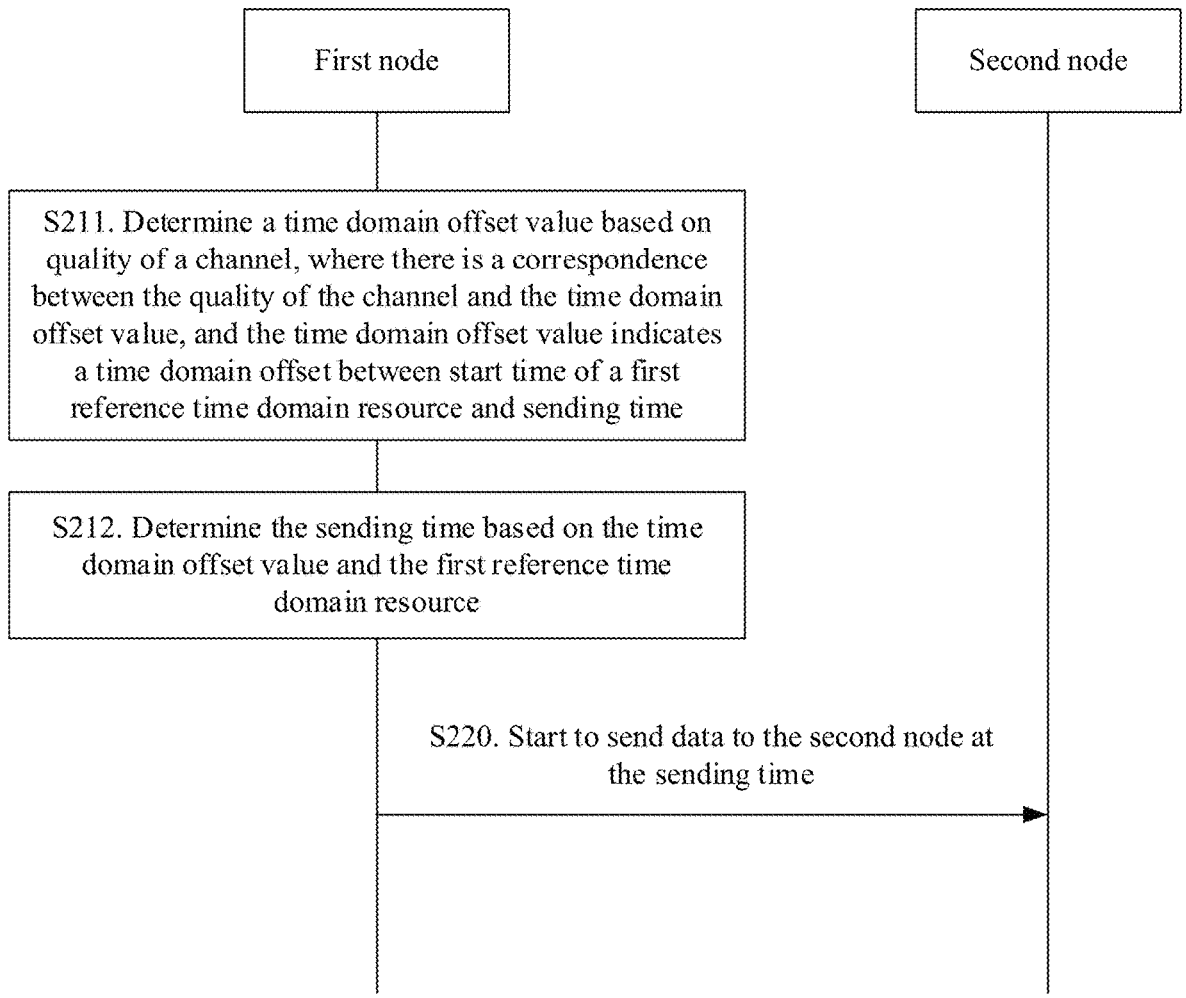
FIG. 4 is a schematic flowchart of a data sending method according to another embodiment of this application.

In another possible implementation, there is a correspondence between the quality of the channel and a time domain offset value, and the time domain offset value indicates a time domain offset between start time of a first reference time domain resource and the sending time. FIG. 4 is used as an example. Based on the method steps shown in FIG. 3, in the method 200, S210 in which the first node determines, based on quality of a channel between the first node and a second node, sending time for starting to send data includes S211 and S212.

S211. The first node determines the time domain offset value based on the quality of the channel.

S212. The first node determines the sending time based on the time domain offset value and the first reference time domain resource.

For a description of S220 shown in FIG. 4, refer to the foregoing description of S220. For brevity, details are not described herein again.

In some possible implementations, there is a correspondence between the quality of the channel and a time domain offset value, and the time domain offset value indicates a time domain offset (where the time domain offset may also be referred to as a time offset) between a start time of a first reference time domain resource and the sending time. The first reference time domain resource may be predefined, may be configured by a control node by using higher layer signaling, or may be indicated by the control node by using physical layer signaling. The higher layer signaling may include, for example, RRC, MAC CE, and RLC signaling, and the physical layer signaling may include, for example, DCI. The control node may be the source node, or may be one of candidate previous-hop nodes of the first node, or control node may be the network-side centralized controller.

The first reference time domain resource is used by at least one candidate previous-hop node of the second node to determine the sending time for sending the data. That is, the first reference time domain resource is shared by candidate previous-hop nodes of the second node. The first reference time domain resource is a time domain resource used by the first node and another node that is at a same hop as the first node to determine the sending time for sending the data (including a same data block). Optionally, the first node and the other node that is at a same hop as the first node may send the data on some or all of the time domain resources included in the first reference time domain resource. For example, in the scenario shown in FIG. 2, the first node may be any one of the relay node 11, the relay node 12, and the relay node 13, and the second node may be any one of the relay node 21, the relay node 22, and the relay node 23. The first reference time domain resource is used by one or more of the relay node 11, the relay node 12, and the relay node 13 to determine a time domain resource for sending the data to one or more of the relay node 21, the relay node 22, and the relay node 23. For example, the relay node 11 may determine, based on the first reference time domain resource, the time domain resource for sending the data to the one or more of the relay node 21, the relay node 22, and the relay node 23. Further, there is the correspondence between the quality of the channel between the first node and the second node and the time domain offset value, and the time domain offset value indicates the time domain offset between the start time of the first reference time domain resource and the sending time. The time domain offset value may be a quantity of symbols starting from the start time of the first reference time domain resource, or a time length starting from the start time of the first reference time domain resource. Optionally, a unit of the time domain offset value may alternatively be a slot, a micro-slot, a mini-slot, a subframe, a half-frame, a frame, or the like.

In S211, the first node determines the time domain offset value based on the quality of the channel and with reference to the correspondence between the quality of the channel and the time domain offset value. If a better channel quality indicates a smaller time domain offset value, the first node may obtain the sending time by adding the time domain offset value to the start time of the first reference time domain resource based on the time domain offset value and with reference to the start time of the first reference time domain resource. Optionally, if a better channel quality indicates a larger time domain offset value, the first node may alternatively obtain the sending time by subtracting the time domain offset value from the start time of the first reference time domain resource based on the time domain offset value and with reference to the start time of the first reference time domain resource. Better channel quality indicates earlier sending time for the first node to start to send the data. In S212, the first node determines the sending time of the data based on the time domain offset value and the first reference time domain resource. The time domain offset value indicates the time domain offset between the start time of the first reference time domain resource and the sending time.

The following provides a description with reference to an example shown in Table 3. The example shown in Table 3 is an example of the correspondence between the quality of the channel and the time domain offset value. The time domain offset value is represented by using the quantity of symbols. The quality of the channel is represented by using a channel quality indicator (CQI).

TABLE 3

| CQI index (index) | Time domain offset value (unit: symbol) |
| --- | --- |
| 15 | 0 |
| 13 | 1 |
| 11 | 2 |
| 9 | 3 |
| . . . | . . . |

As shown in Table 3, better channel quality indicates a smaller time domain offset value. Optionally, the first node may first obtain a CQI between the first node and the second node, determine that the CQI corresponds to a CQI index in Table 1, and then determine a time domain offset value based on the correspondence between the CQI index and the time domain offset value shown in Table 3. Assuming that an index of the CQI between the first node and the second node is 15, it may be determined that the time domain offset value is 0 based on the correspondence between the CQI index and the time domain offset value. That is, the time offset between the start time of the first reference time domain resource and the sending time is 0. In this case, the sending time of the data is the start time of the first reference time domain resource. If an index of the CQI between the first node and the second node is 13, it may be determined that the time domain offset value is 2 based on the correspondence between the CQI index and the time domain offset value. In other words, the sending time of the data is a next symbol of two symbols after the start time of the first reference time domain resource. Alternatively, the sending time of the data is a next symbol after waiting for two symbols from the start time of the first reference time domain resource. Alternatively, the sending time of the data is a third symbol after waiting for two symbols from the start time of the first reference time domain resource, that is, the data starts to be sent after waiting for two symbols from the start time of the first reference time domain resource.

Optionally, Table 3 shows a correspondence between the channel quality parameter value and the time domain offset value. In some possible implementations, a correspondence between the value interval of the channel quality parameter value and the time domain offset value may be further predefined or preconfigured. For example, Table 4 shows the correspondence between the value interval of the channel quality parameter value and the time domain offset value. The time domain offset value is represented by using the quantity of symbols, and the channel quality parameter value is represented by using the CQI.

TABLE 4

| Value interval of the CQI index | Time domain offset value (unit: symbol) |
| --- | --- |
| (13, 15] | 0 |
| (11, 13] | 1 |
| (9, 11] | 2 |
| (7, 9] | 3 |
| . . . | . . . |

As shown in Table 4, the first node may first obtain a CQI between the first node and the second node, determine a CQI index, determine that the CQI index corresponds to a value interval of a CQI index in Table 4, and then determine a time domain offset value based on the correspondence between the value interval of the CQI index and the time domain offset value. After the time domain offset value is determined, the sending time of the data is determined with reference to the start time of the first reference time domain resource.

It should be understood that Table 3 and Table 4 are merely examples, and should not impose any limitation on the correspondence between the quality of the channel and the time domain offset value. For example, the quality of the channel may alternatively be represented by using another parameter. Optionally, the quality of the channel may alternatively be represented by using an SNR, an SINR, RSRP, or the like. For another example, the time domain offset value may alternatively be represented by using another time unit. Optionally, the time unit of the time domain offset value may alternatively be a slot, a micro-slot, a mini-slot, a subframe, a half-frame, a frame, or the like. For another example, the correspondence may alternatively be the correspondence between the value range of the channel quality parameter value and the time domain offset value. For another example, the correspondence may alternatively be a correspondence between the channel quality parameter value and specific waiting duration. The specific waiting duration is calculated from the start time of the first reference time domain resource. This is not limited in this application.

It should be further understood that there may be a one-to-one correspondence between the channel quality parameter value and the time domain offset value. That is, different channel quality parameter values correspond to different time domain offset values. Optionally, there may be a many-to-one correspondence between the channel quality parameter value and the time domain offset value. That is, a plurality of different channel quality parameter values may correspond to a same time domain offset value. Similarly, there may be a one-to-one or many-to-one correspondence between the value interval of the channel quality parameter value and the time domain offset value.

In another possible implementation of the foregoing time domain offset value, the time domain offset value indicates a time domain offset between end time of the first reference time domain resource and the sending time. In this case, the first node may determine the time domain offset value between the end time of the first reference time domain resource and the sending time based on the correspondence between the quality of the channel and the time domain offset value. If a better channel quality indicates a larger time domain offset value, the sending time may be determined by subtracting the time domain offset value from the end time of the first reference time domain resource. If a better channel quality indicates a smaller time domain offset value, the sending time may be determined by adding the time domain offset value to the end time of the first reference time domain resource. According to the data sending method provided in this application, the sending time of the data is determined by using the correspondence between the quality of the channel between the first node and the second node and the time domain offset value and with reference to the quality of the channel between the first node and the second node and the first reference time domain resource, so that the determined sending time of the data may be relatively accurate. The flexibility of determining the sending time is improved.

Figure 5:
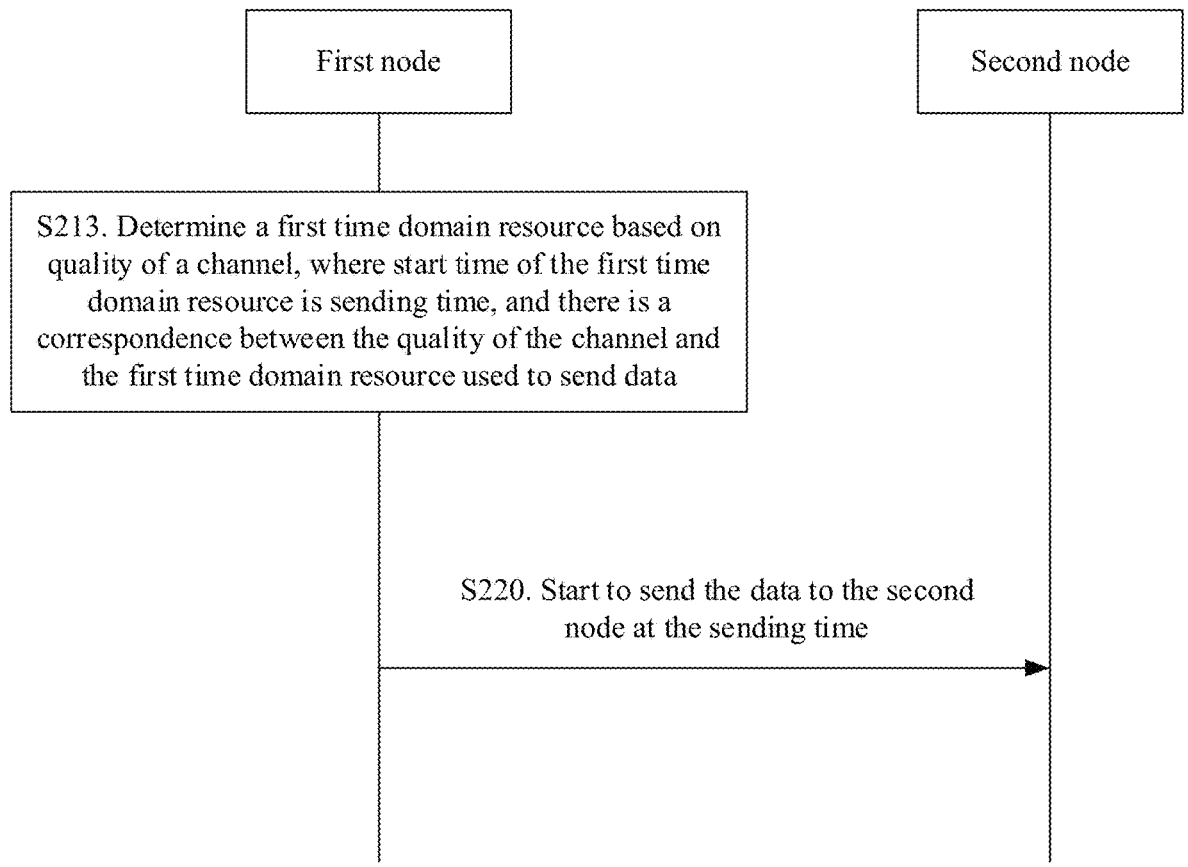
FIG. 5 is a schematic flowchart of a data sending method according to another embodiment of this application.

In another possible implementation, there is a correspondence between the quality of the channel and a first time domain resource used to send the data. FIG. 5 is used as an example. Based on the method steps shown in FIG. 3, in the method 200, S210 in which the first node determines, based on quality of a channel between the first node and a second node, sending time for starting to send data includes S213.

S213. The first node determines the first time domain resource based on a quality of the channel, where start time of the first time domain resource is the sending time.

For a description of S220 shown in FIG. 5, refer to the foregoing description of S220. For brevity, details are not described herein again.

In some other possible implementations, there is a correspondence between the quality of the channel and a first time domain resource used to send the data. The first time domain resource herein is a time domain resource used by the first node to send the data. Optionally, a group of time domain resources may be configured or defined in advance for a node that needs to send data. The node that needs to send the data herein may include some or all nodes at a same hop. For example, the nodes include the first node and other nodes that are at a same hop as the first node. Further, the data to be sent by the some or all nodes at the same hop may be a same data block. A correspondence between a time domain resource and quality of a channel is defined, or a correspondence between a time domain resource and a value interval of a channel quality parameter value is defined. Different time domain resources have different start locations, different time domain resources have different lengths, or the like. Different time domain resources correspond to different channel qualities. For example, Table 5 shows a correspondence between a time domain resource index and quality of a channel, and each time domain resource index uniquely corresponds to one time domain resource. In the example shown in Table 5, the quality of the channel is represented by using a CQI.

TABLE 5

| CQI index (index) | Time domain resource index (index) |
| --- | --- |
| 15 | 0 |
| 14 | 1 |
| 13 | 2 |
| 12 | 3 |
| ... | ... |

In Table 5, different time domain resource indexes correspond to different time domain resources. That is, there may be a one-to-one correspondence between a CQI index and a time domain resource index. Optionally, different CQI indexes may alternatively correspond to one time domain resource index. That is, alternatively, there may be a many-to-one correspondence between CQI indexes and a time domain resource index. For example, the first node may first obtain a CQI between the first node and the second node, determine that the CQI corresponds to a CQI index in Table 5, determine a time domain resource index based on the correspondence between the CQI index and the time domain resource index shown in Table 5, and then determine the first time domain resource based on the time domain resource index. In this case, the start time of the first time domain resource is the sending time for the first node to send the data. That is, the first node starts to send the data at the start time (for example, a start symbol) of the first time domain resource. Alternatively, the sending time may be the start time of the first time domain resource plus or minus a time domain offset value. The time domain offset value may be related to the quality of the channel, or the time domain offset value may be preconfigured or predefined.

Optionally, the correspondence may further be a correspondence between a value interval of a channel quality parameter value and a time domain resource index. For example, Table 6 shows the correspondence between the time domain resource index and the value interval of the channel quality parameter value, and each time domain resource index uniquely corresponds to one time domain resource. In the example shown in Table 6, the quality of the channel is represented by using an SNR.

TABLE 6

| SNR value interval | Time domain resource index (index) |
|---|---|
| [25, ∞) | 0 |
| [20, 25) | 1 |
| [15, 20) | 2 |
| [10, 15) | 3 |
| ... | ... |

In Table 6, different time domain resource indexes correspond to different time domain resources. Different SNR value intervals correspond to different time domain resource indexes. That is, different SNR value intervals correspond to different time domain resources. Optionally, after determining an SNR of the channel between the first node and the second node, the first node determines that the SNR corresponds to an SNR value interval in Table 6, and then determines, based on the correspondence between the SNR value interval and the time domain resource index, a first time domain resource corresponding to the SNR. In this case, the start time of the first time domain resource is the sending time for the first node to send the data. That is, the first node starts to send the data at the start time (for example, the start symbol) of the first time domain resource. Alternatively, the sending time may be the start time of the first time domain resource plus or minus the time domain offset value.

It should be understood that Table 5 and Table 6 are merely examples, and should not impose any limitation on the correspondence between the quality of the channel and the time domain resource.

It should be further understood that there may be a one-to-one correspondence between a quality parameter value and a time domain resource index. That is, different channel quality parameter values correspond to different time domain resource indexes. Optionally, there may alternatively be a many-to-one correspondence between quality parameter values and a time domain resource index. That is, a plurality of different channel quality parameter values may alternatively correspond to a same time domain resource index. Similarly, there may be a one-to-one or many-to-one correspondence between a value interval of a channel quality parameter value and a time domain resource index. According to the data sending method provided in this application, it is easy to determine the sending time of the data by using the correspondence between the quality of the channel between the first node and the second node and the time domain resource used to send the data, and with reference to the quality of the channel between the first node and the second node. The complexity of determining the sending time of the data is reduced, and resources are saved.

Figure 6:
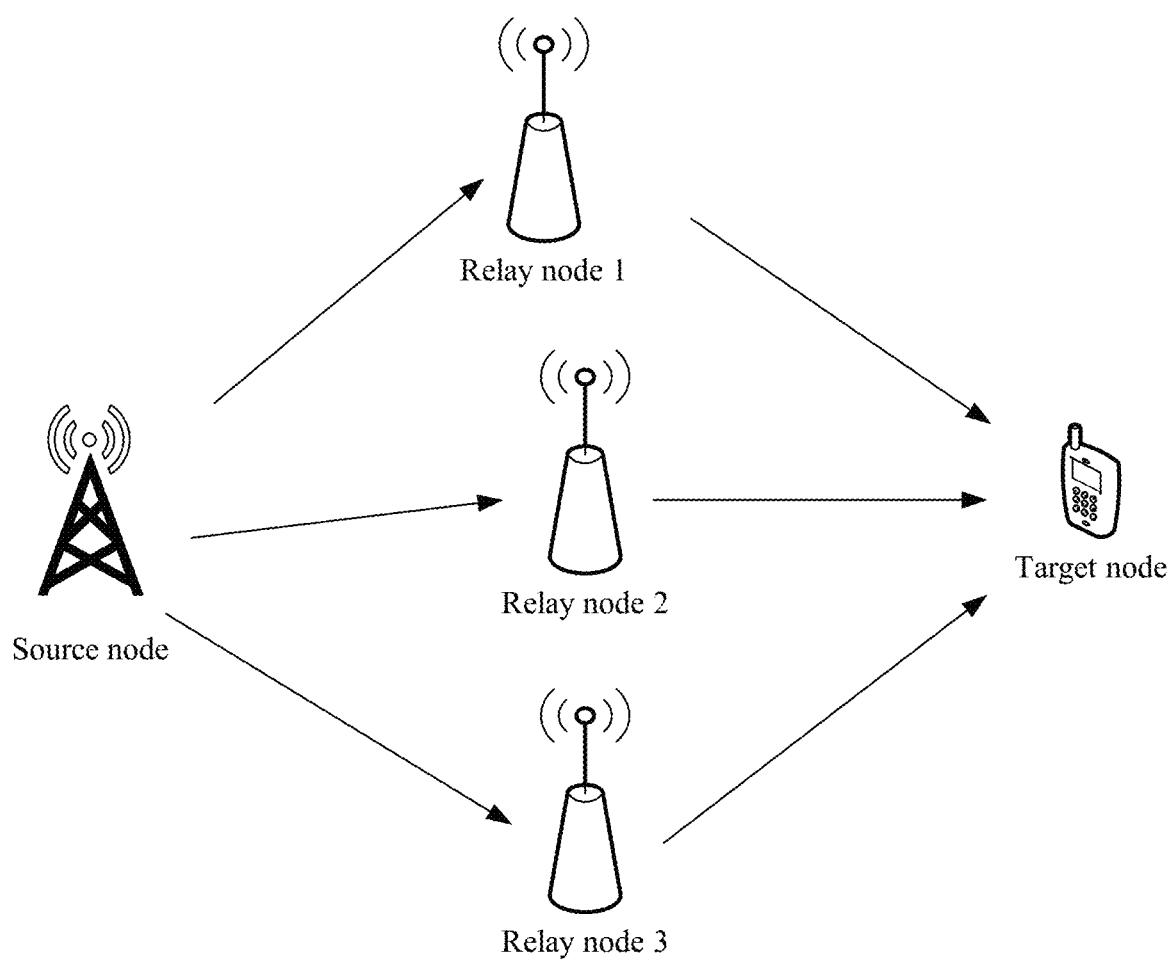
FIG. 6 is a schematic diagram of a structure of still another possible network architecture applicable to this application.

The following is described with reference to a specific example, and a communication scenario shown in FIG. 6 is used as an example for description. A system shown in FIG. 6 includes a source node, a relay node 1, a relay node 2, a relay node 3, and a target node. The relay node 1, the relay node 2, and the relay node 3 may be considered as candidate next-hop nodes of the source node. Any one of the relay node 1, the relay node 2, and the relay node 3 may determine quality of a channel between the relay node 1, the relay node 2, or the relay node 3, and the target node. It is assumed that the quality of the channel is represented by using a CQI, a value of a CQI between the relay node 1 and the target node is a CQI 1, a value of a CQI between the relay node 2 and the target node is a CQI 2, and a value of a CQI between the relay node 3 and the target node is a CQI 3. In this case, the relay node 1, the relay node 2, and the relay node 3 may separately determine sending time for sending data (for example, a same data block). The relay node 1, the relay node 2, and the relay node 3 may separately determine the sending time of the data based on a correspondence between a CQI and sending time, a correspondence between a CQI and a time domain offset value, or a correspondence between a CQI and a time domain resource for sending the data, and then start to send the data at the corresponding sending time. Values of the CQI 1, the CQI 2, and the CQI 3 are usually different. In this case, the relay node 1, the relay node 2, and the relay node 3 start to send the data (for example, the same data block) at different times. The relay node 1, the relay node 2, and the relay node 3 send the data at the corresponding sending time thereof. When the relay node 1, the relay node 2, and the relay node 3 determine the sending time based on the correspondence between the quality of the channel and the time domain offset value, a shared first reference time domain resource may be preconfigured or predefined for the relay node 1, the relay node 2, and the relay node 3. In this way, time used by different nodes to send data is differentiated. The reliability and efficiency of sending the data by the nodes are improved.

Figure 7:
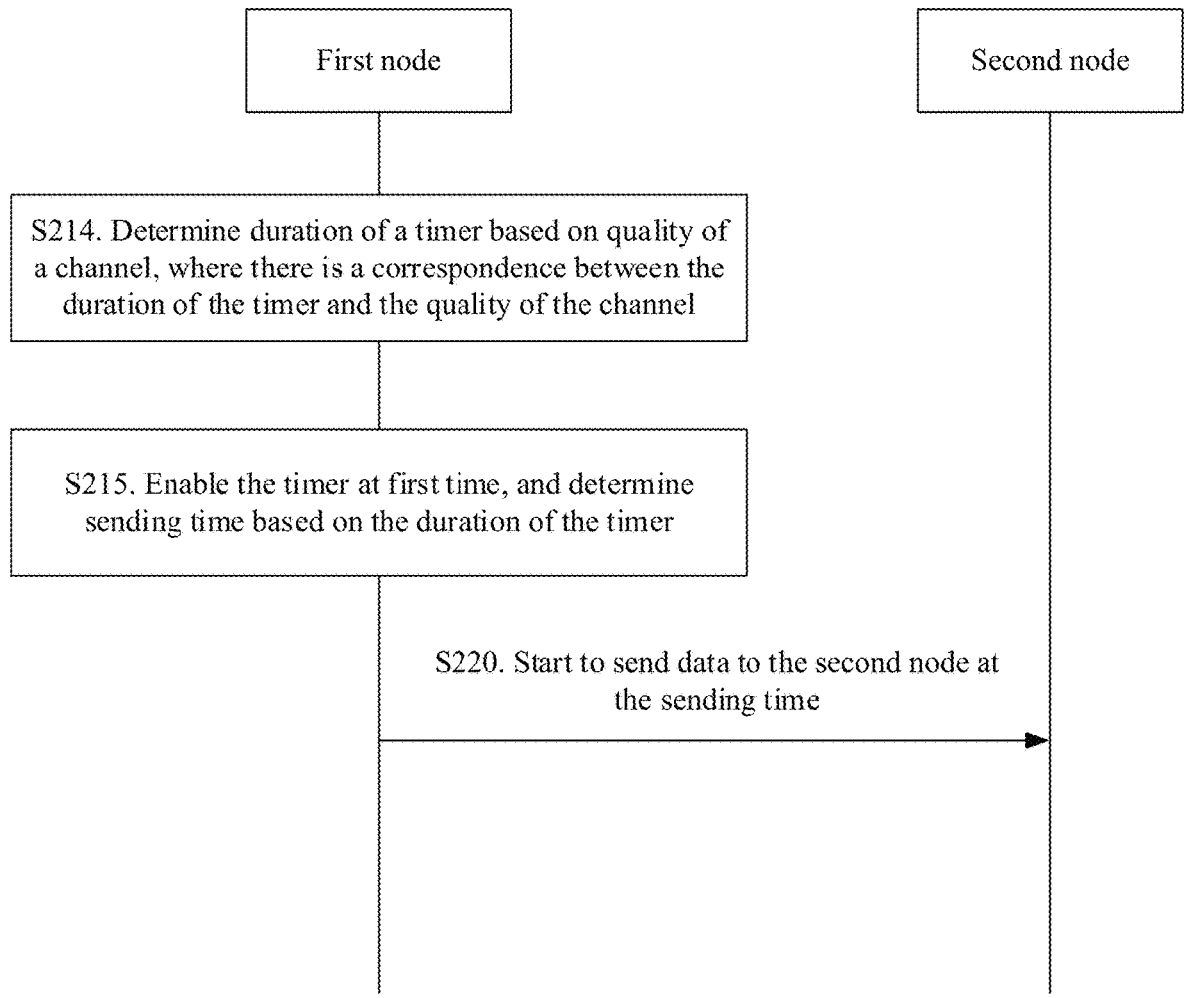
FIG. 7 is a schematic flowchart of a data sending method according to still another embodiment of this application.

In another possible implementation, FIG. 7 is used as an example. Based on the method steps shown in FIG. 3, in the method 200, S210 in which the first node determines, based on the quality of the channel between the first node and a second node, a sending time for starting to send data includes S214 and S215.

S214. The first node determines a duration of a timer based on a quality of the channel, where there is a correspondence between the duration of the timer and the quality of the channel.

S215. The first node enables the timer at a first time, and determines the sending time based on the duration of the timer.

For a description of S220 shown in FIG. 7, refer to the foregoing description of S220. For brevity, details are not described herein again.

In some other possible implementations, there is a correspondence between the quality of the channel between the first node and the second node and the duration of the timer. Optionally, the timer may be preconfigured for the first node. The correspondence between the quality of the channel and the duration of the timer may be predefined, and may be configured by the control node by using higher layer signaling, or may be indicated by the control node by using physical layer signaling. For example, better channel quality may indicate a shorter duration of the timer. A timer may be preconfigured for each of the first node and some or all of other nodes that are at a same hop as the first node. Enabling time of the timer is the first time. Optionally, the first time may be the start time of the first reference time domain resource. That is, the enabling time (an enabling moment) of the timer may be the start time of the first reference time domain resource. It should be understood that the enabling time of the timer may alternatively be the start time of the first reference time domain resource plus or minus a time domain offset value. The time domain offset value may be related to the quality of the channel, or the time domain offset value may be preconfigured or predefined. Alternatively, the enabling time of the timer may be the end time of the first reference time domain resource, that is, the enabling time of the timer may be the end time of the first reference time domain resource. It should be understood that, the enabling time of the timer may alternatively be the end time of the first reference time domain resource plus or minus a time domain offset value. The time domain offset value may be related to the quality of the channel, or the time domain offset value may be preconfigured or predefined. Alternatively, the enabling time of the timer may be another time. For example, the enabling time that is of the timer and that corresponds to the first node may be a time at which the first node generates data to be sent, or time at which the first node receives data to be forwarded. The first time is not limited in this application. Enabling time that is of timers and that corresponds to different nodes may be the same or different. In S214, the first node may determine, based on the quality of the channel between the first node and the second node and with reference to the correspondence between the quality of the channel and the duration of the timer, the duration that is of the timer and that corresponds to the first node. In S215, the first node enables the timer at the first time, and determines the sending time based on the duration of the timer. For example, the first node may determine the sending time based on the duration of the timer and the first time. Timeout time (a timeout moment) of the timer may be the sending time of the data. Alternatively, the timeout time of the timer plus or minus a time domain offset value is the sending time of the data. Alternatively, the sending time of the data may be determined by using the timeout time of the timer. For example, there is a correspondence between the sending time of the data and the timeout time of the timer. After the first node enables the timer, at the timeout time of the timer, the first node may start to send the data on a configured or predefined time domain resource. Optionally, the configured or predefined time domain resource may be the first reference time domain resource.

The timeout time of the timer may be the enabling time of the timer plus the duration of the timer, the timeout time of the timer is the enabling time of the timer plus the duration of the timer plus a time offset value, the timeout time of the timer is the enabling time of the timer plus the duration of the timer minus a time offset value, or the like. This is not limited in this application. Optionally, the time offset value may be related to the quality of the channel.

In other possible implementations, a correspondence between a value interval of the quality of the channel and the duration of the timer may be further predefined or configured. The first node may determine the duration of the timer based on a correspondence between the value interval of the channel quality parameter and the duration of the timer, and determine the sending time based on the duration of the timer.

It should be understood that there may be a one-to-one correspondence between the quality of the channel and the duration of the timer. That is, different channel quality parameter values correspond to different time domain offset values. Optionally, there may be a many-to-one correspondence between the quality of the channel and the duration of the timer. That is, a plurality of different channel quality parameter values may alternatively correspond to duration values of a same timer. Similarly, there may be a one-to-one or many-to-one correspondence between the value interval of the channel quality parameter value and the duration of the timer.

The timer is configured for the first node, and the sending time of the data is determined by using the correspondence between the quality of the channel between the first node and the second node and the duration of the timer and with reference to the enabling time of the timer, so that the determined sending time of the data may be relatively accurate. The flexibility of determining the sending time is improved.

In this embodiment of this application, the first node may determine, in the foregoing manners, the sending time for starting to send the data. Optionally, the sending time determined by the first node is later than or equal to the first time.

Figure 8:
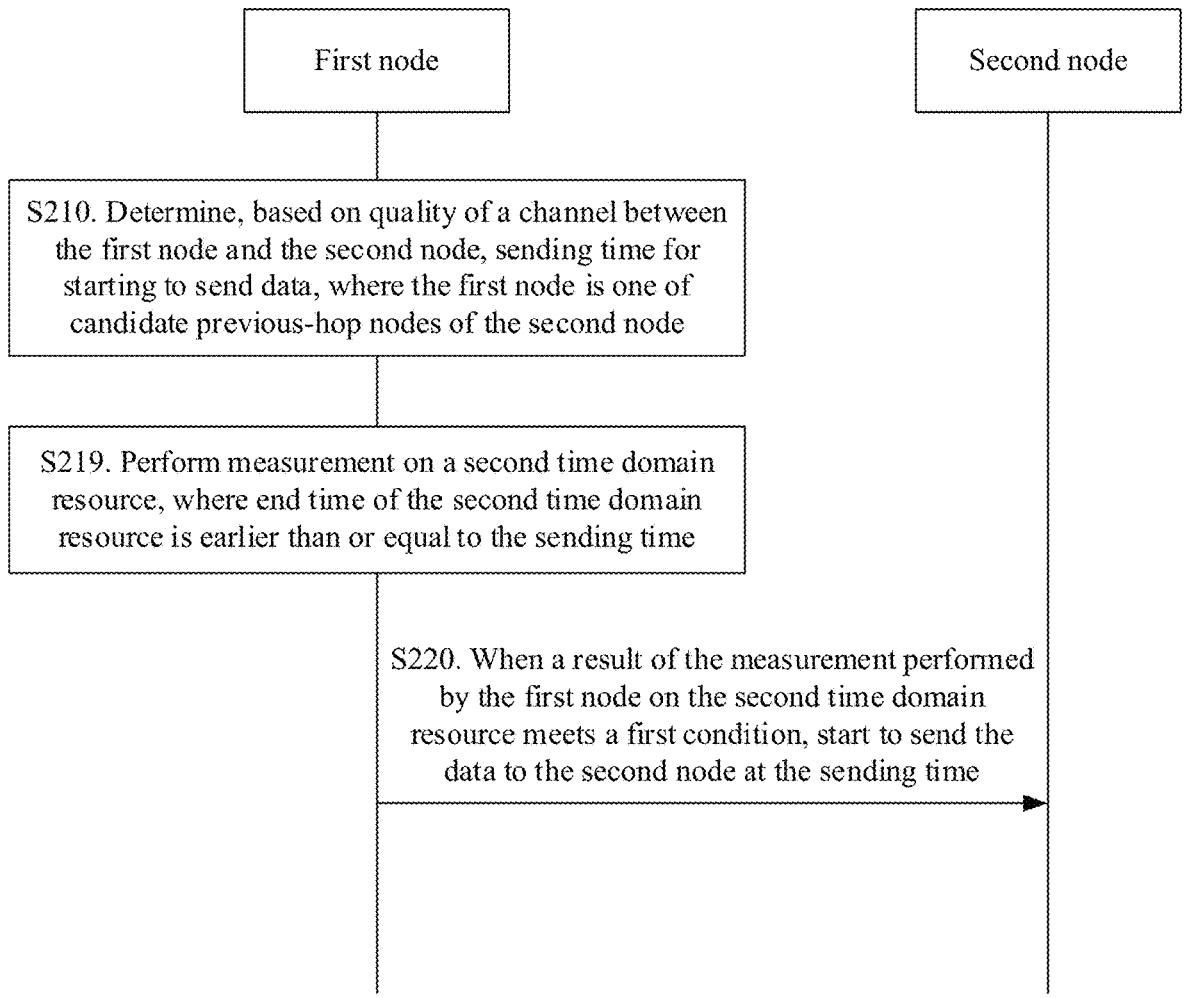
FIG. 8 is a schematic flowchart of a data sending method according to another embodiment of this application.

In some instances of this application, FIG. 8 is used as an example. Based on the method steps shown in FIG. 3, the method 200 further includes S219.

S219. The first node performs measurement on a second time domain resource, where an end time of the second time domain resource is earlier than or equal to the sending time.

For descriptions of S210 and S220 shown in FIG. 8, refer to the foregoing descriptions of S210 and S220. For brevity, details are not described herein again.

In S219, after determining the sending time of the data, the first node may perform measurement on the second time domain resource. The measurement herein may be understood as the first node performing monitoring, sensing, detection, or the like on the second time domain resource. For example, the measurement that the first node may perform on the second time domain resource includes: received signal strength indicator (RSSI) value measurement, reference signal received power (RSRP) measurement, reference signal received quality (RSRQ) measurement, ACK/NACK (acknowledgement/negative acknowledgement) information detection, or other indication signal measurement. The end time of the second time domain resource is earlier than or equal to the sending time.

Optionally, a start time of the second time domain resource may be a start time of a second reference time domain resource. The second reference time domain resource may be predefined, may be configured by the control node by using higher layer signaling, or may be indicated by the control node by using physical layer signaling. The second reference time domain resource is used by the first node to determine the second time domain resource. The second reference time domain resource may be shared by the candidate previous-hop nodes of the second node. The second reference time domain resource may be understood as a time domain resource that is used by the first node and at least one of several nodes at a same hop as the first node to determine data measurement. Optionally, the start time of the second time domain resource may alternatively be a start time of the second reference time domain resource plus or minus a time domain offset value. The time domain offset value may be related to the quality of the channel. Alternatively, the time domain offset value may be predefined, may be configured by the control node by using higher layer signaling, or may be indicated by the control node by using physical layer signaling. Optionally, alternatively, the start time of the second time domain resource may be predefined, may be configured by the control node by using higher layer signaling, or may be indicated by the control node by using physical layer signaling.

Optionally, the end time of the second time domain resource may be the sending time of the data. Optionally, the end time of the second time domain resource may alternatively be the sending time of the data plus or minus a time domain offset value. The time domain offset value may be related to the quality of the channel. Alternatively, the time domain offset value may be predefined, may be configured by the control node by using higher layer signaling, or may be indicated by the control node by using physical layer signaling. The second time domain resource may be a time domain resource that is used by another node at a same hop as the first node to send the data. Optionally, alternatively, the end time of the second time domain resource may be predefined, may be configured by the control node by using higher layer signaling, or may be indicated by the control node by using physical layer signaling.

In S219, the first node performs the measurement on the second time domain resource, to determine whether another node is also sending the same data.

It should be understood that the second reference time domain resource and the first reference time domain resource may be the same or different. That is, the second reference time domain resource and the first reference time domain resource may be a same time domain resource. Alternatively, the second reference time domain resource and the first reference time domain resource may be different. For example, the start time of the second reference time domain resource is different from that of the first reference time domain resource, and/or the end time of the second reference time domain resource is different from that of the first reference time domain resource.

Optionally, when a result of the measurement performed by the first node on the second time domain resource meets a first condition, S220 is performed: The first node starts to send the data to the second node at the sending time. The first condition includes: a transmit power measured on the second time domain resource is less than or equal to a first threshold, an RSSI measured on the second time domain resource is less than or equal to a second threshold, RSRQ measured on the second time domain resource is less than or equal to a third threshold, NACK information is detected on the second time domain resource, and/or the like. The first threshold, the second threshold, and the third threshold herein may be predefined, may be configured by the control node by using higher layer signaling, or may be indicated by the control node by using physical layer signaling. If the power measured by the first node on the second time domain resource is less than or equal to the first threshold, the RSSI measured on the second time domain resource is less than or equal to the second threshold, the RSRQ measured on the second time domain resource is less than or equal to the third threshold, the negative acknowledgement (negative acknowledgement, NACK) information is detected on the second time domain resource, and/or when the indication signal that indicates another node not to send the data is received on the second time domain resource, then the other node at the same hop as the first node does not send the data, or quality of sending the data does not meet a predefined or configured threshold. In this case, the first node starts to send the data to the second node at the sending time.

According to the data sending method provided in this application, the first node may detect, before the sending time of the data, whether another node is also sending the data. If it is determined that no other node is sending the data, the first node starts to send the data to the second node at the sending time. Redundant transmission of the same data block can be avoided, a waste of power and a waste of channel resources of a node can be avoided, and the communication efficiency can be improved.

It should be understood that for S219, the timer may be configured for the first node, and then the sending time of the data may be determined by using the correspondence between the quality of the channel between the first node and the second node and the duration of the timer and with reference to the enabling time of the timer. The first node may start the measurement on the second time domain resource at the enabling time of the timer. During operation of the timer, if the result of the measurement does not meet the first condition, the first node may stop, reset, or delete the timer. That is, only a node whose timer is timed out sends the data.

It should be understood that the foregoing first condition may further include another condition. For example, the first condition may further include: for example, RSRP measured by the first node on the second time domain resource is less than or equal to a fourth threshold. Specific content included in the first condition is not limited in this application.

It should be further understood that if the data sent by the first node is from a third node, the first node is one of candidate next-hop nodes of the third node. In this case, when the result of the measurement performed by the first node on the second time domain resource meets the first condition, the first node may further decode the data sent by the third node. Only when the data is correctly decoded and the result of the measurement performed by the first node on the second time domain resource meets the first condition, the first node starts to send the data to the second node at the sending time. Alternatively, even if the data is from the third node, the first node may not decode the data, and starts to forward the data to the second node at the sending time provided that the result of the measurement performed by the first node on the second time domain resource meets the first condition.

It should be further understood that S210 shown in FIG. 8 may include S211 and S212. Alternatively, S210 may include S213. Alternatively, S210 may include S214 and 215. For specific descriptions, refer to the foregoing descriptions of S211 and S212, S213, S214, and S215. For brevity, details are not described herein again.

In the embodiments of this application, the quality of the channel between the first node and the second node may be one or more of the following:

an SNR of the channel between the first node and the second node, a value interval of the SNR, an SINR of the channel between the first node and the second node, a value interval of the SINR, a CQI of the channel between the first node and the second node, a value interval of the CQI, an RSSI of the channel between the first node and the second node, a value interval of the RSSI, an RSRP of the channel between the first node and the second node, or a value interval of the RSRP.

Specifically, the quality of the channel between the first node and the second node may be represented by using the foregoing one or more channel quality parameters. For example, the quality of the channel between the first node and the second node may be represented by using the RSSI and the RSRP. Alternatively, the quality of the channel between the first node and the second node may be represented by using the SINR or the value interval of the SINR.

It should be understood that in this application, in addition to the foregoing channel quality parameters, another channel quality parameter may be used to represent the quality of the channel between the first node and the second node. This is not limited in this application.

This application further provides a data sending method. Using FIG. 9 as an example, the method includes S310, S319, and S320.

S310. A first node determines, based on quality of a channel between the first node and a second node, a sending time for starting to send data, where the first node is one of several candidate previous-hop nodes of the second node.

S319. The first node performs a measurement on a second time domain resource before the sending time, where an end time of the second time domain resource is earlier than or equal to the sending time. Optionally, a start time of the second time domain resource may be a start time of a second reference time domain resource. Optionally, the end time of the second time domain resource may be the sending time of the data.

S320. When a result of the measurement performed by the first node on the second time domain resource does not meet a first condition, the first node determines not to send the data to the second node.

The first condition includes: a transmit power measured on the second time domain resource is less than or equal to a first threshold, an RSSI measured on the second time domain resource is less than or equal to a second threshold, RSRQ measured on the second time domain resource is less than or equal to a third threshold, NACK information is detected on the second time domain resource, and/or an indication signal that indicates another node not to send the data is received on the second time domain resource.

Specifically, for a description of S310, refer to the foregoing description of S210. For brevity, details are not described herein again.

For S319, after determining the sending time for starting to send the data, the first node may perform the measurement on the second time domain resource before the sending time. For descriptions of the second time domain resource and the second reference time domain resource herein, refer to the foregoing descriptions of the second time domain resource and the second reference time domain resource in S219. For brevity, details are not described herein again. If the result of the measurement performed by the first node on the second time domain resource does not meet the first condition, it is proved that at least one other node at the same hop as the first node is sending the data. Then, in S320, the first node determines not to send the data to the second node. For a description of the first condition, refer to the description of the first condition in S219. For example, the first condition may include: the transmit power measured on the second time domain resource is greater than the first threshold, the RSSI measured on the second time domain resource is greater than the second threshold, the RSRQ measured on the second time domain resource is greater than the third threshold, ACK information is received on the second time domain resource, and/or an indication signal that indicates another node to send the data is received on the second time domain resource.

According to the data sending method provided in this application, the first node determines, based on a quality of a channel between the first node and a candidate next-hop node of the first node, the sending time for starting to send the data. In this way, the node can flexibly determine the sending time of the data. In addition, the first node may detect, before the sending time of the data, whether another node is also sending the data. If another node is sending the data, the first node does not send the data to the second node. Redundant transmission of a same data block can be avoided, and a waste of power and a waste of channel resources of a node can be avoided.

For S319, a timer may be configured for the first node, and then the sending time of the data may be determined by using a correspondence between the quality of the channel between the first node and the second node and duration of the timer and with reference to enabling time of the timer. For descriptions of the enabling time and timeout time of the timer, the sending time, and the like, refer to the descriptions of the timer in S214 and 215. For brevity, details are not described herein again. The first node may start the measurement on the second time domain resource at the enabling time of the timer. During operation of the timer, if the result of the measurement does not meet the first condition, the first node may stop, reset, or delete the timer. In addition, the first node does not send the data to the second node.

It should be understood that if the data sent by the first node is from a third node, the first node is one of several candidate next-hop nodes of the third node. The first node may further decode the data sent by the third node. If an error occurs during decoding of the data, the first node does not send the data to the second node even if no other node is detected sending the data. That is, the first node does not send the data to the second node if either of the two conditions is met: an error occurs during decoding of the data, and another node is also sending the data. Alternatively, even if the data is from the third node, the first node may not decode the data. That is, the first node does not send the data to the second node provided that another node is also sending the data.

This application further provides a data sending method. The method may be performed by a control node. The control node is configured to control the foregoing first node to send data, information, and the like. The control node may be further configured to control another node that is at a same hop as the first node or a node that is not at a same hop as the first node to send data, information, and the like.

Figure 10:
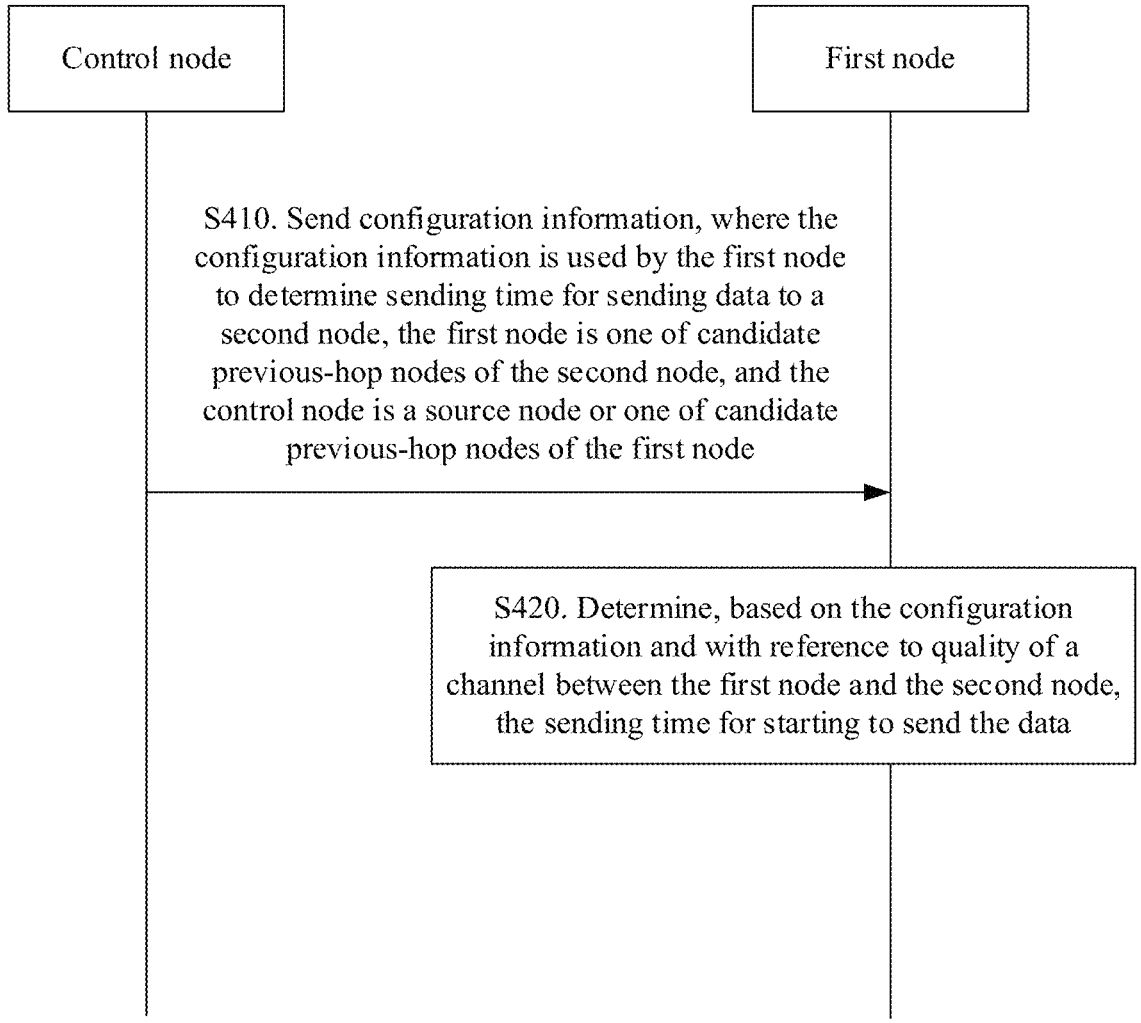
FIG. 10 is a schematic flowchart of a data sending method according to still another embodiment of this application.

The following describes in detail the data sending method provided in this application with reference to FIG. 10. FIG. 10 is a schematic flowchart of a data sending method 400 according to an embodiment of this application. The method 400 may be applied to the scenarios shown in FIG. 1 and FIG. 2, and certainly may be applied to other communication scenarios. This is not limited herein in this embodiment of this application.

It should be understood that in this embodiment of this application, the method is described by using an example in which the control node performs the method. By way of example and not limitation, the method may alternatively be performed by a chip, a chip system, a processor, or the like used in the control node. The control node may be a source node, the control node may be one of several candidate previous-hop nodes of the first node, or the control node may be a network-side centralized controller. For example, the control node may be a network device, a relay node, or a terminal device.

The method 400 shown in FIG. 10 may include S410 and S420. The following describes the steps in the method 400 in detail with reference to FIG. 10.

S410. The control node sends configuration information to the first node, where the configuration information is used by the first node to determine a sending time for starting to send data to a second node, and the first node is one of several candidate previous-hop nodes of the second node. The control node is a source node, or is one of several candidate previous-hop nodes of the first node, or a network-side centralized controller.

S420. The first node determines, based on the configuration information, and with reference to quality of a channel between the first node and the second node, the sending time for starting to send the data.

Specifically, when the first node determines the sending time for starting to send the data to the second node, the control node may send the configuration information to the first node, where the configuration information is used by the first node to determine the sending time for starting to send the data to the second node. The control node may be the source node, may be the one of the candidate previous-hop nodes of the first node, or may be the network-side centralized controller. In S410, the control node may send, to the first node, the configuration information that is used by the first node to determine the sending time for starting to send the data to the second node.

In S420, the first node determines, based on the configuration information, and with reference to the quality of the channel between the first node and the second node, the sending time for starting to send the data. For descriptions of the first node, the second node, the sending time of the data, and the like, refer to the related descriptions of S210. For brevity, details are not described herein again.

According to the data sending method provided in this application, the control node may notify the first node of the configuration information used by the first node to determine the sending time for starting to send the data to the second node. After receiving the configuration information, the first node determines, with reference to the quality of the channel between the first node and the second node, the sending time for starting to send the data. The accuracy and efficiency of determining the sending time by the first node can be improved. A waste of power and a waste of channel resources of the first node are avoided, and the communication efficiency is improved.

In a possible implementation, the configuration information includes a correspondence between the quality of the channel and the sending time. The first node may determine, based on the quality of the channel, and with reference to the correspondence, the sending time for starting to send the data. For a related description of the correspondence between the quality of the channel and the sending time, refer to the description of the correspondence between the quality of the channel and the sending time in the specification. For brevity, details are not described herein again.

In another possible implementation, the configuration information includes a correspondence between the quality of the channel and a time domain offset value, and the time domain offset value indicates a time domain offset between start time of a first reference time domain resource and the sending time. The first reference time domain resource is used by the first node and another node that is at a same hop as the first node to determine a time domain resource for sending the data. In S420, the first node may determine the sending time based on the correspondence between the quality of the channel and the time domain offset value and with reference to the first reference time domain resource. For descriptions of the correspondence between the quality of the channel and the time domain offset value, the time domain offset value, the first reference time domain resource, and the like, refer to the related descriptions of S212 and S213. For brevity, details are not described herein again. Optionally, the configuration information further includes time domain information of the first reference time domain resource.

In another possible implementation, the configuration information includes a correspondence between the quality of the channel and a first time domain resource used to send the data. The first time domain resource herein is a time domain resource used by the first node to send the data. In S420, the first node may determine the sending time based on the correspondence between the quality of the channel and the first time domain resource used to send the data. For specific descriptions of the correspondence between the quality of the channel and the first time domain resource used to send the data, the first time domain resource, and S420, refer to the related description of S213. For brevity, details are not described herein again.

In another possible implementation, the configuration information includes a correspondence between a duration of a timer and the quality of the channel. That is, the control node may configure a timer for the first node, and may configure an enabling time of the timer. For example, the enabling time of the timer is a first time. Optionally, the first time may be the start time of the first reference time domain resource, or the like. In S420, the first node may determine the duration of the timer based on the quality of the channel, and with reference to the configuration information, and determine the sending time based on the enabling time of the timer. For example, timeout time of the timer may be the sending time of the data. For the enabling time of the timer, the timeout time of the timer, the correspondence between the duration of the timer and the quality of the channel, and a relationship between the timeout time of the timer and the sending time, refer to the related descriptions of S214 and S215. For brevity, details are not described herein again. Optionally, the configuration information may further include the enabling time of the timer, the relationship between the timeout time of the timer and the sending time, and the like.

In some possible implementations, the configuration information further includes the time domain information of the first reference time domain resource.

In some other possible implementations, the configuration information further includes time domain information of a second reference time domain resource. The second reference time domain resource may be understood as a time domain resource that is used by the first node and at least one of the nodes at a same hop as the first node to determine data measurement. The first node may determine a second time domain resource based on the second reference time domain resource, and then perform measurement on the second time domain resource. An end time of the second time domain resource is earlier than or equal to the sending time. Optionally, a start time of the second time domain resource is a start time of the second reference time domain resource. Optionally, the end time of the second time domain resource is the sending time. For details about the second reference time domain resource, the second time domain resource, and a specific process in which the first node performs the measurement on the second time domain resource, refer to the related descriptions of S219. For brevity, details are not described herein again.

In another possible implementation, the configuration information further includes time domain information of the second time domain resource. That is, alternatively, the second time domain resource may be configured by the control node by using higher layer signaling, or may be indicated by the control node by using physical layer signaling.

In some possible implementations, the configuration information may further include a first condition. Optionally, if a result of the measurement performed by the first node on the second time domain resource meets the first condition, the first node starts to send the data to the second node at the sending time. If the result of the measurement performed by the first node on the second time domain resource does not meet the first condition, the first node does not send the data. The first condition includes one or more of: transmit power measured on the second time domain resource is less than or equal to a first threshold, an RSSI measured on the second time domain resource is less than or equal to a second threshold, RSRQ measured on the second time domain resource is less than or equal to a third threshold, NACK information is detected on the second time domain resource, or an indication signal that indicates another node not to send the data is received on the second time domain resource. The control node may notify the first node of the first condition to be met when the first node sends the data at the sending time. Optionally, the first condition may alternatively be determined by the first node. The configuration information may include the thresholds included in the first condition. For example, the configuration information includes at least one of the first threshold, the second threshold, and the third threshold.

It should be understood that the first condition included in the foregoing configuration information may further include another condition. For example, the first condition may further include: for example, RSRP measured by the first node on the second time domain resource is less than or equal to a fourth threshold. The foregoing configuration information may further include another threshold, and the like. A specific condition and threshold, and the like included in the configuration information are not limited in this application.

In some other possible implementations, the configuration information may further include a channel quality parameter used to represent the quality of the channel. For example, the channel quality parameter may be one or more of the following:

an SNR of the channel between the first node and the second node, a value interval of the SNR, an SINR of the channel between the first node and the second node, a value interval of the SINR, a CQI of the channel between the first node and the second node, a value interval of the CQI, an RSSI of the channel between the first node and the second node, a value interval of the RSSI, an RSRP of the channel between the first node and the second node, or a value interval of the RSRP. It should be understood that, in addition to the foregoing channel quality parameter used to represent the quality of the channel, the configuration information may further include another channel quality parameter used to represent the quality of the channel. This is not limited herein in this application.

In some possible implementations, the configuration information may be higher layer signaling sent by the control node to the first node, or may be physical layer signaling sent by the control node to the first node. The higher layer signaling may include, for example, RRC, MAC CE, and RLC signaling, and the physical layer signaling may include, for example, DCI. A specific form of the configuration information is not limited in this application.

In some other possible implementations, the control node may further send the data to the first node.

According to the data sending method provided in this application, the control node notifies the first node of related content by using the configuration information, where the related content is used by the first node to determine the sending time for starting to send the data to the second node. For example, the configuration information includes the correspondence between the quality of the channel between the first node and the second node and the sending time. The first node determines the sending time based on the configuration information, and with reference to the quality of the channel. The accuracy and efficiency of determining the sending time by the first node can be improved.

It should be understood that, in the embodiments of this application, the "first", the "second", and the like are merely intended to indicate that a plurality of objects are different. For example, the first node and the second node are merely intended to represent different nodes, and should not be read to imply a hierarchy between the nodes nor the quantities thereof. First, second, and the like described above should not impose any limitation on the embodiments of this application.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that numerals used in the embodiments of this application are differentiated merely for ease of description, but are not used to limit the scope of the embodiments of this application. The sequence numbers of the foregoing processes do not mean execution sequences. The execution sequences of the processes should be determined according to functions and internal logic of the processes, and should not be construed as any limitation on the implementation processes of the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the foregoing method 200, method 300, and method 400 may be unnecessary, or some steps may be newly added, or any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein again.

It should be further understood that in the embodiments of this application, "predefinition" may be implemented by pre-storing corresponding code or a corresponding table in a device (for example, a terminal device or a network device) or in another manner that can be used to indicate related information. A specific implementation of "predefinition" is not limited in this application.

In correspondence to the data sending methods provided in the foregoing method embodiments, an embodiment of this application further provides a corresponding communication apparatus (which may also be referred to as a communication device). The communication apparatus includes a corresponding module configured to perform each part in the foregoing embodiments. The module may be software, hardware, or a combination of software and hardware.

Figure 11:
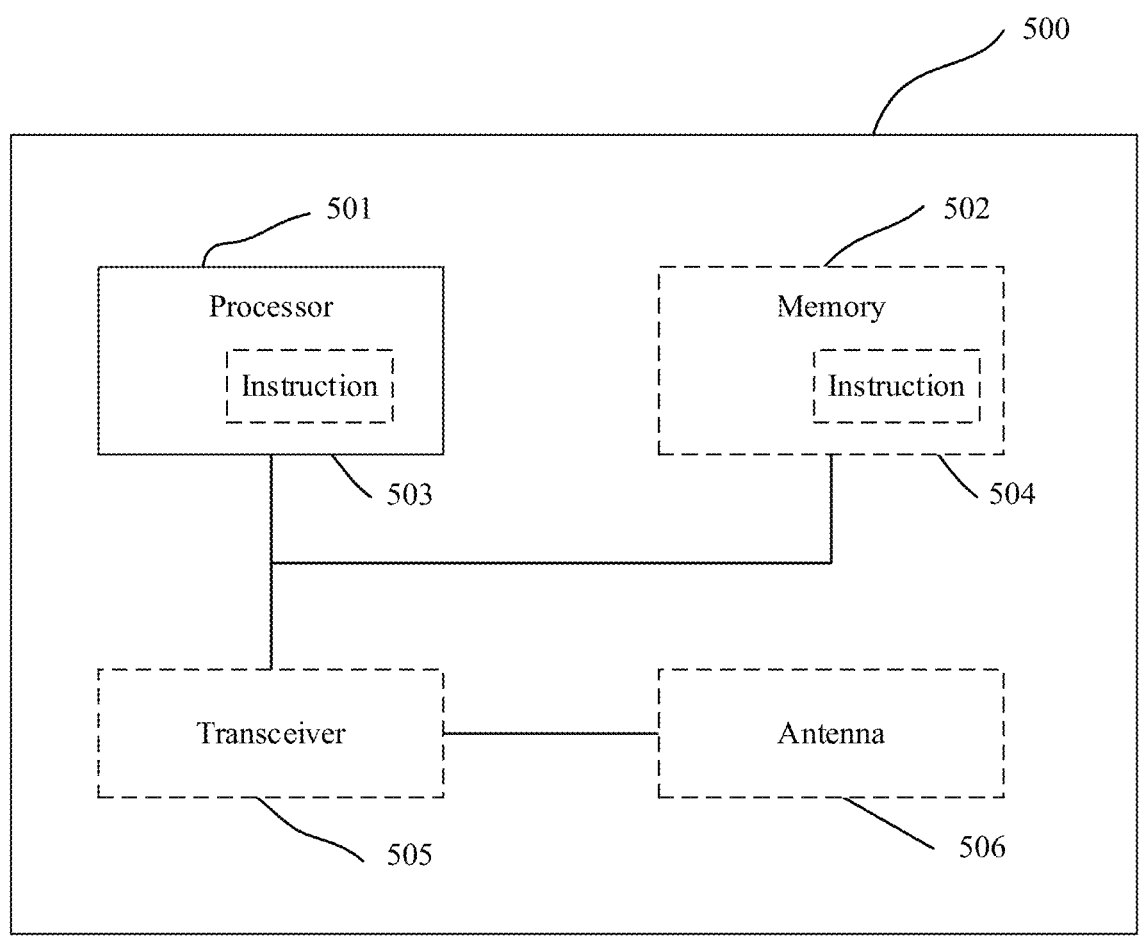
FIG. 11 is a schematic diagram of a communication apparatus according to an embodiment of this application.

FIG. 11 is a schematic diagram of a structure of a communication apparatus. The communication apparatus 500 may be a network device, a terminal, a node (a control node or a relay node), a component (for example, an integrated circuit or a chip) of a terminal, a component (for example, an integrated circuit or a chip) of a network device, or a component (for example, an integrated circuit or a chip) of a node. The communication apparatus may be configured to implement the method that corresponds to the first node or the control node and that is described in the foregoing method embodiments. For details, refer to the descriptions in the foregoing method embodiments.

The communication apparatus 500 may include one or more processors 501. The processor 501 may also be referred to as a processing unit, and may implement a specific control function. The processor 501 may be a general-purpose processor, a dedicated processor, or the like. For example, the processor may be a baseband processor or a central processing unit. The baseband processor may be configured to process a communication protocol and communication data. The central processing unit may be configured to control the communication apparatus (for example, a base station, a baseband chip, a distributed unit (DU), or a centralized unit (CU)), execute a software program, and process data of the software program.

In an optional design, the processor 501 may alternatively store instructions and/or data 503, and the instructions and/or data 503 may be run by the processor, to enable the communication apparatus 500 to perform the method that corresponds to the first node or the control node and that is described in the foregoing method embodiments.

In another optional design, the processor 501 may include a transceiver unit configured to implement receiving and sending functions. For example, the transceiver unit may be a transceiver circuit or an interface. A circuit or an interface configured to implement the receiving function and a circuit or an interface configured to implement the sending function may be separated or may be integrated together.

In another possible design, the communication apparatus 500 may include a circuit, and the circuit may implement the sending function, the receiving function, or the communication function in the foregoing method embodiments.

Optionally, the communication apparatus 500 may include one or more memories 502 that may store instructions 504. The instructions may be run on the processor, to enable the communication apparatus 500 to perform the methods described in the foregoing method embodiments. Optionally, the memory may further store data. Optionally, the processor may further store instructions and/or data. The processor and the memory may be separately disposed, or may be integrated together. For example, various correspondences described in the foregoing method embodiments may be stored in the memory, or may be stored in the processor.

Optionally, the communication apparatus 500 may further include a transceiver 505 and/or an antenna 506. The processor 501 may be referred to as a processing unit, and controls the communication apparatus (for example, a terminal or a network device). The transceiver 505 may be referred to as a transceiver unit, a transceiver machine, a transceiver circuit, a transceiver, or the like, and is configured to implement the receiving and sending functions of the communication apparatus.

In a possible design, a communication apparatus 500 (for example, an integrated circuit, a wireless device, a circuit module, a network device, a terminal, or a relay node) includes a processing unit 501 and a transceiver unit 505.

The processing unit 501 is configured to determine, based on a quality of a channel between the communication apparatus and a second node, a sending time for starting to send data, where the communication apparatus is one of several candidate previous-hop nodes of the second node.

The transceiver unit 505 starts to send the data to the second node at the sending time.

According to the communication apparatus provided in this application, when the communication apparatus needs to send data to a next-hop node of the communication apparatus, the communication apparatus may determine, based on a quality of a channel between the communication apparatus and the next-hop node of the communication apparatus, a sending time for starting to send the data. In this way, the communication apparatus can flexibly determine the sending time of the data, and sending times of data on different communication apparatuses are differentiated, thereby avoiding a waste of power of the communication apparatus, and improving the channel resource utilization efficiency. In addition, the sending time of the data is related to the quality of the channel for sending the data, so that the reliability of sending the data can be improved.

Optionally, there is a correspondence between the quality of the channel and the sending time.

Optionally, there is a correspondence between the quality of the channel and a time domain offset value, and the time domain offset value indicates a time domain offset between a start time of a first reference time domain resource and the sending time; and the processing unit 501 is specifically configured to: determine the time domain offset value based on the quality of the channel; and determine the sending time based on the time domain offset value and the reference time domain resource.

Optionally, there is a correspondence between the quality of the channel and a first time domain resource used to send the data; and the processing unit 501 is specifically configured to determine the first time domain resource based on the quality of the channel, where start time of the first time domain resource is the sending time.

Optionally, the processing unit 501 is specifically configured to: determine a duration of a timer based on the quality of the channel, where there is a correspondence between the duration of the timer and the quality of the channel; and enable the timer at a first time, and determine the sending time based on the duration of the timer.

Optionally, the processing unit 501 is further configured to perform measurement on a second time domain resource, where an end time of the second time domain resource is earlier than or equal to the sending time.

Optionally, the transceiver unit 505 is specifically configured to: when a result of the measurement on the second time domain resource meets a first condition, start to send the data to the second node at the sending time.

Optionally, the first condition includes: a power measured on the second time domain resource is less than or equal to a first threshold, and/or a received signal strength indicator (RSSI) measured on the second time domain resource is less than or equal to a second threshold.

Optionally, the first reference time domain resource is predefined, or configured by using higher layer signaling.

Optionally, a second reference time domain resource is predefined, or configured by using higher layer signaling.

Optionally, the transceiver unit 505 is further configured to receive the data from a third node, where the communication apparatus 500 is one of several candidate next-hop nodes of the third node.

Optionally, the quality of the channel is one or more of the following:
a signal-to-noise ratio (SNR), a value interval of the SNR, a signal to interference plus noise ratio (SINR), a value interval of the SINR, a channel quality indicator (CQI), a value interval of the CQI, a received signal strength indicator (RSSI), a value interval of the RSSI, a reference signal received power (RSRP), or a value interval of the RSRP.

It should be understood that, for a specific process of the steps performed by the units of the communication apparatus 500, refer to the foregoing processes and/or steps corresponding to the first node in the embodiment shown in any one of FIG. 3 to FIG. 5 and FIG. 7 to FIG. 9, and the related embodiments of the method 200 and the method 300 in the foregoing description. To avoid repetition, details are not described herein again.

In another possible design, a communication apparatus 500 (for example, an integrated circuit, a wireless device, a circuit module, a network device, or a terminal) may include a processing unit 501 and a transceiver unit 505.

The processing unit 501 is configured to generate configuration information, where the configuration information is used by a first node to determine a sending time for starting to send data to a second node, and the first node is one of several candidate previous-hop nodes of the second node.

The transceiver unit 505 is configured to send the configuration information to the first node.

The communication apparatus provided in this application may notify the first node of the configuration information used by the first node to determine the sending time for starting to send the data to the second node. After receiving the configuration information, the first node determines, with reference to quality of a channel between the first node and the second node, the sending time for starting to send the data. Thus, the accuracy and efficiency of determining the sending time by the first node can be improved. Also, a waste of power and a waste of channel resources of the first node are avoided, and the communication efficiency is improved.

Optionally, the configuration information includes a correspondence between the quality of the channel and the sending time.

Optionally, the configuration information includes a correspondence between the quality of the channel and a time domain offset value, and the time domain offset value indicates a time domain offset between a start time of a first reference time domain resource and the sending time.

Optionally, the configuration information includes a correspondence between the quality of the channel and a first time domain resource used to send the data.

Optionally, the configuration information includes a correspondence between duration of a timer and the quality of the channel.

Optionally, the configuration information further includes time domain information of the first reference time domain resource.

Optionally, the configuration information further includes time domain information of a second reference time domain resource.

Optionally, the configuration information may further include a first condition, and the first condition includes one or more of: a transmit power measured on a second time domain resource is less than or equal to a first threshold, an RSSI measured on the second time domain resource is less than or equal to a second threshold, RSRQ measured on the second time domain resource is less than or equal to a third threshold, NACK information is detected on the second time domain resource, or an indication signal that indicates another node not to send the data is received on the second time domain resource.

Optionally, the configuration information may further include a channel quality parameter used to represent the quality of the channel. The channel quality parameter may be one or more of the following:

an SNR of a channel between the first node and the second node, a value interval of the SNR, an SINR of the channel between the first node and the second node, a value interval of the SINR, a CQI of the channel between the first node and the second node, a value interval of the CQI, an RSSI of the channel between the first node and the second node, a value interval of the RSSI, an RSRP of the channel between the first node and the second node, or a value interval of the RSRP.

Optionally, the configuration information may be higher layer signaling sent by the apparatus to the first node, or may be physical layer signaling sent by the control node to the first node. The higher layer signaling may include, for example, RRC, MAC CE, and RLC signaling, and the physical layer signaling may include, for example, DCI.

It should be understood that for a specific process of the steps performed by the units of the communication apparatus 500, refer to the foregoing processes and/or steps corresponding to the control node in the embodiment shown in FIG. 10 and the related embodiment of the method 400 in the foregoing description. To avoid repetition, details are not described herein again.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiments, the communication apparatus is described by using the network device, the terminal, or the node as an example. However, a scope of the communication apparatus described in this application is not limited to the example, and the structure of the communication apparatus may not be limited by FIG. 5. The communication apparatus may be an independent device or may be a part of a relatively large device. For example, the device may be:

(1) an independent integrated circuit IC, a chip, or a chip system or subsystem;

(2) a set including one or more ICs, where optionally, the IC set may further include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld phone, a mobile unit, a vehicle-mounted device, a network device, a cloud device, an artificial intelligence device, or (6) another device.

Figure 12:
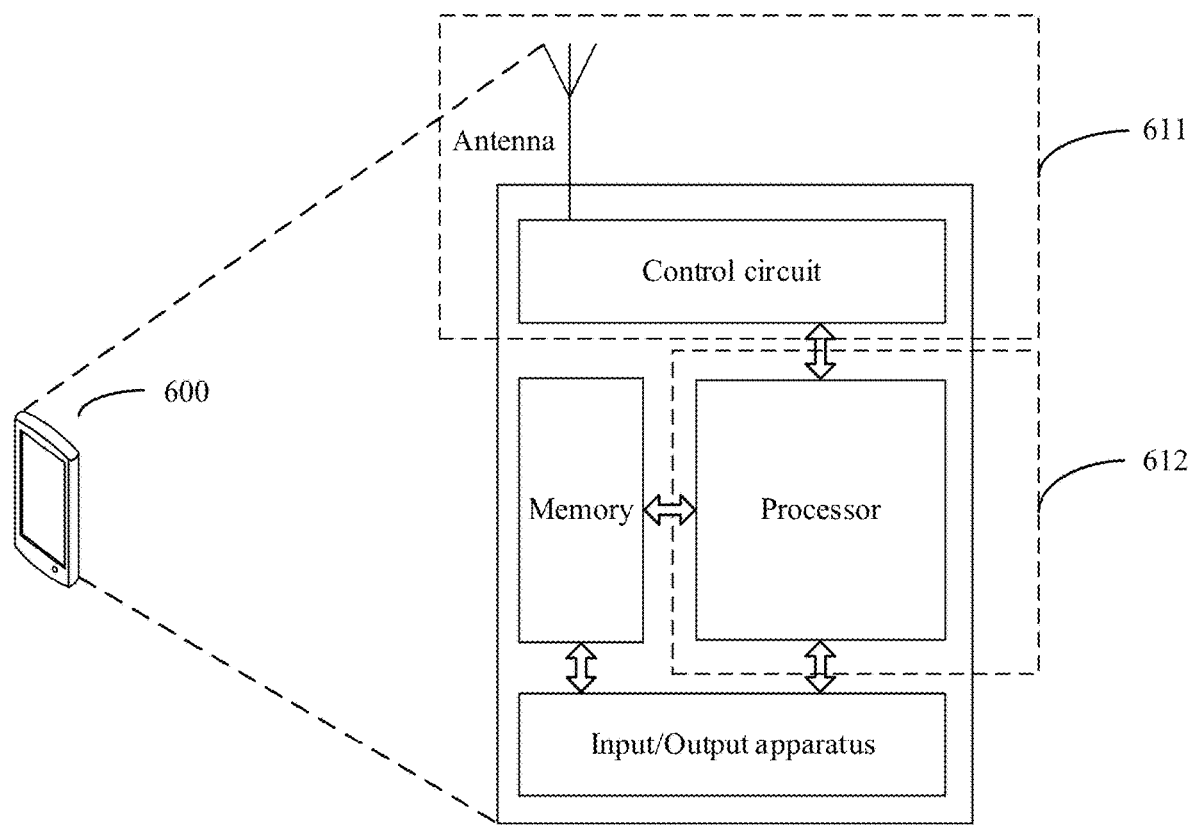
FIG. 12 is a schematic diagram of another communication apparatus according to an embodiment of this application.

FIG. 12 is a schematic diagram of a structure of a terminal. The terminal may be applied to the system shown in FIG. 1, FIG. 2, or FIG. 6. For ease of description, FIG. 12 shows only main components of the terminal. As shown in FIG. 12, the terminal 600 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user.

After user equipment is powered on, the processor may read a software program stored in a storage unit, parse and execute instructions of the software program, and process data of the software program. When data needs to be sent in a wireless manner, after performing baseband processing on the to-be-sent data, the processor outputs a baseband signal to the radio frequency circuit. After processing the baseband signal, the radio frequency circuit obtains a radio frequency signal and sends the radio frequency signal to the outside through the antenna in a form of an electromagnetic wave. When data is sent to the user equipment, the radio frequency circuit receives a radio frequency signal through the antenna, further converts the radio frequency signal into a baseband signal, and outputs the baseband signal to the processor, and the processor converts the baseband signal into data and processes the data.

A person skilled in the art may understand that, for ease of description, FIG. 12 shows only one memory and one processor. An actual terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to control the entire terminal, execute the software program, and process the data of the software program. The processor in FIG. 12 integrates functions of the baseband processor and the central processing unit. A person skilled in the art may understand that the baseband processor and the central processing unit may be individually independent processors, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

In an example, the antenna and the control circuit that have receiving and sending functions may be considered as a transceiver unit 611 of the terminal 600, and the processor having a processing function may be considered as a processing unit 612 of the terminal 600. As shown in FIG. 12, the terminal 600 includes the transceiver unit 611 and the processing unit 612. The transceiver unit may also be referred to as a transceiver, a transceiver machine, a transceiver apparatus, or the like. Optionally, a component that is in the transceiver unit 611 and that is configured to implement a receiving function may be considered as a receiving unit, and a component that is in the transceiver unit 611 and that is configured to implement a sending function may be considered as a sending unit. In other words, the transceiver unit 611 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like. Optionally, the receiving unit and the sending unit may be integrated into one unit, or may be a plurality of units independent of each other. The receiving unit and the sending unit may be at one geographical location, or may be distributed across a plurality of geographical locations.

Figure 13:
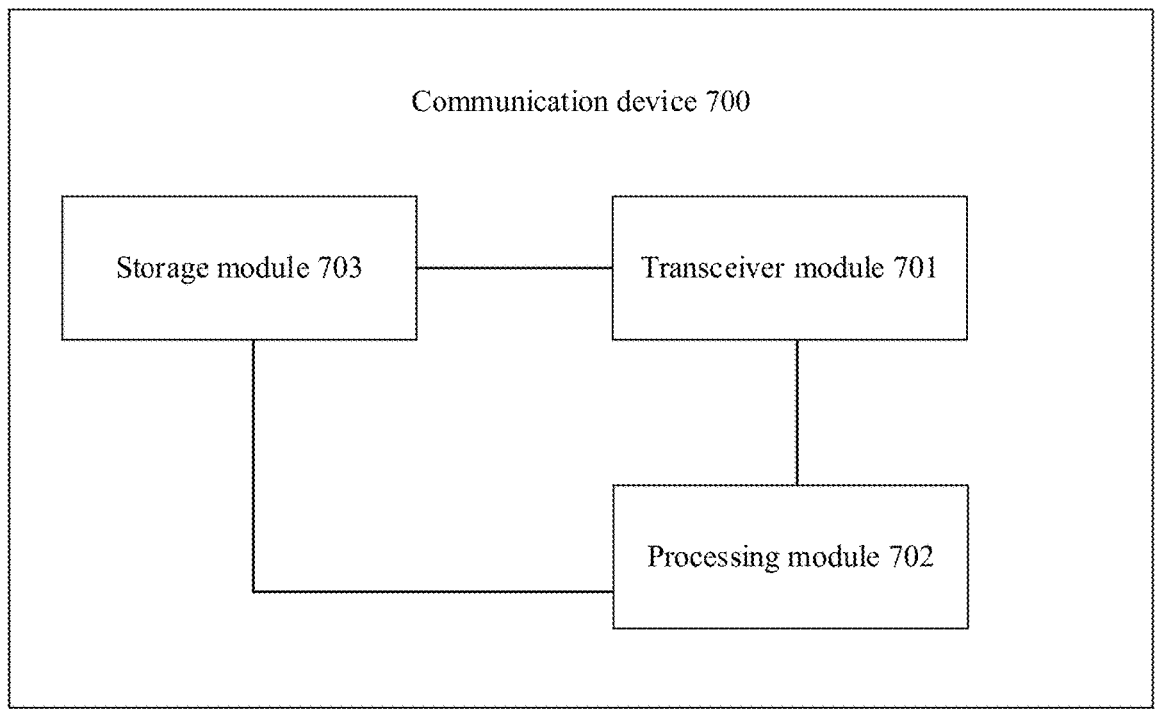
FIG. 13 is a schematic diagram of a communication apparatus according to an embodiment of this application.

As shown in FIG. 13, another embodiment of this application provides a communication apparatus (a communication device) 700. The communication apparatus may be a terminal, or may be a component (for example, an integrated circuit or a chip) of the terminal. Alternatively, the communication apparatus may be a network device, or may be a component (for example, an integrated circuit or a chip) of the network device. The communication apparatus may alternatively be a relay node or a control node, or may be a component (for example, an integrated circuit or a chip) of the relay node or the control node. The communication apparatus may alternatively be another communication module, and is configured to implement operations corresponding to the first node, the second node, or the control node in the method embodiments of this application. The communication apparatus 700 may include a processing module 702 (a processing unit). Optionally, the communication apparatus may further include a transceiver module 701 (a transceiver unit) and a storage module 703 (a storage unit).

In a possible design, one or more modules in FIG. 13 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be separately disposed, or may be integrated together.

The communication apparatus has a function of implementing the first node described in the embodiments of this application. For example, the communication apparatus includes modules, units, or means corresponding to the steps performed by the first node described in the embodiments of this application, and the functions, units, or means may be implemented by software, may be implemented by hardware, or may be implemented by hardware by executing corresponding software. For details, refer to corresponding descriptions in the foregoing corresponding method embodiments.

Alternatively, the communication apparatus has a function of implementing the control node described in the embodiments of this application. For example, the communication apparatus includes modules, units, or means corresponding to the steps performed by the control node described in the embodiments of this application, and the functions, units, or means may be implemented by software, may be implemented by hardware, or may be implemented by hardware by executing corresponding software. For details, refer to corresponding descriptions in the foregoing corresponding method embodiments.

Optionally, the modules in the communication apparatus 700 in this embodiment of this application may be configured to perform the methods described in FIG. 3 to FIG. 5 and FIG. 7 to FIG. 10 in the embodiments of this application.

In a possible implementation, the processing module 702 is configured to determine, based on a quality of a channel between the communication apparatus and a second node, a sending time for starting to send data, where the communication apparatus 700 is one of several candidate previous-hop nodes of the second node.

The transceiver module 701 is configured to start to send the data to the second node at the sending time.

The communication apparatus provided in this embodiment of this application can determine, based on a quality of a channel between the communication apparatus and a next-hop node of the communication apparatus, a sending time for starting to send the data. In this way, the communication apparatus can flexibly determine the sending time of the data, thereby avoiding a waste of power of the communication apparatus, and improving the channel resource utilization efficiency. In addition, the sending time of the data is related to the quality of the channel for sending the data, so that the reliability of sending the data can be improved.

It should be understood that units of the communication apparatus 700 may further perform procedures and/or steps corresponding to the first node in the embodiment shown in any one of FIG. 3 to FIG. 5 and FIG. 7 to FIG. 9 and the related embodiments of the method 200 and the method 300. For related descriptions, refer to the foregoing procedures and/or steps performed by the first node. To avoid repetition, details are not described herein again.

In another possible design, the processing module 702 is configured to generate configuration information, where the configuration information is used by a first node to determine a sending time for starting to send data to a second node, and the first node is one of several candidate previous-hop nodes of the second node.

The transceiver module 701 is configured to send the configuration information to the first node.

The communication apparatus provided in this application can notify the first node of the configuration information used by the first node to determine the sending time for starting to send the data to the second node, so that the accuracy and efficiency of determining the sending time by the first node can be improved. A waste of power and a waste of channel resources of the first node are avoided, and the communication efficiency is improved.

It should be understood that units of the communication apparatus 700 may further perform procedures and/or steps corresponding to the control node in the embodiment shown in FIG. 10 and the related embodiment of the method 400 in the foregoing description. For related descriptions, refer to the foregoing procedures and/or steps performed by the control node. To avoid repetition, details are not described herein again.

An embodiment of this application further provides a communication system. The communication system includes one or more first nodes and/or one or more second nodes. Optionally, the communication system may further include the foregoing control node.

An embodiment of this application further provides a computer-readable medium, configured to store computer program code. The computer program includes instructions used to perform the data sending methods in the embodiments of this application in the method 200 to the method 400. The readable medium may be a read-only memory (ROM) or a random access memory (RAM). This is not limited in this embodiment of this application.

This application further provides a computer program product. The computer program product includes instructions. When the instructions are executed, the first node and the control node are enabled to perform operations corresponding to the first node or the control node in the foregoing methods.

An embodiment of this application further provides a system chip. The system chip includes a processing unit and a communication unit. The processing unit may be, for example, a processor, and the communication unit may be, for example, an input/output interface, a pin, or a circuit. The processing unit may execute computer instructions, to enable a chip in the communication apparatus to perform any data sending method provided in the foregoing embodiments of this application.

Optionally, the computer instructions are stored in a storage unit.

Optionally, the storage unit is a storage unit inside the chip, such as a register or a cache. Alternatively, the storage unit may be a storage unit that is inside the terminal and that is located outside the chip, such as a ROM, another type of static storage device that can store static information and instructions, or a RAM. The processor mentioned in any of the foregoing descriptions may be a CPU, a microprocessor, an ASIC, or one or more integrated circuits for controlling program execution of the foregoing feedback information transmission method. The processing unit and the storage unit may be decoupled, separately disposed on different physical devices, and connected in a wired or wireless manner to implement functions of the processing unit and the storage unit, to support the system chip in implementing various functions in the foregoing embodiments. Alternatively, the processing unit and the memory may be coupled to a same device.

It may be understood that the memory in the embodiments of this application may be a transitory memory or a non-transitory memory, or may include a transitory memory and a non-transitory memory. The non-transitory memory may be a ROM, a programmable read-only memory (programmable ROM, PROM), an erasable programmable read-only memory (EPROM), an electrically erasable programmable read-only memory (EEPROM), or a flash memory. The transitory memory may be a RAM and is used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In this application, unless otherwise specified, an element represented in a singular form is intended to represent "one or more", but is not intended to represent "one and only one". "Several" or "some" means "one or more".

A person of ordinary skill in the art may be aware that, the method steps and the units described in the embodiments disclosed in this specification can be implemented by electronic hardware, computer software, or a combination thereof. To clearly describe interchangeability between the hardware and the software, the foregoing has generally described steps and compositions of each embodiment based on functions. Whether the functions are performed by hardware or software depends on particular applications and design constraint conditions of the technical solution. A person of ordinary skill in the art may use different methods to implement the described functions for each particular application, but it should not be considered that the implementation goes beyond the scope of this application. It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the apparatus embodiments described above are only examples. For example, division into the units is only logical function division, and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data sending method, comprising:
   measuring a quality of a channel between a first node and a second node to determine a channel quality parameter value;
   determining, by the first node based on the channel quality parameter value, a sending time for starting to send data, wherein the first node is one of several candidate previous-hop nodes of the second node; and
   sending, by the first node, the data to the second node, starting at the sending time.

2. The method according to claim 1, wherein
   there is a correspondence between the channel quality parameter value and the sending time.

3. The method according to claim 1, wherein there is a correspondence between the channel quality parameter value and a time domain offset value that indicates a time domain offset between a start time of a first reference time domain resource and the sending time; and
   determining, by the first node, the sending time comprises:
   determining, by the first node, the time domain offset value based on the channel quality parameter value; and
   determining, by the first node, the sending time based on the time domain offset value and the reference time domain resource.

4. The method according to claim 1, wherein there is a correspondence between the channel quality parameter value and a first time domain resource used to send the data; and
   determining, by the first node, the sending time comprises:
   determining, by the first node, the first time domain resource based on the channel quality parameter value, wherein a start time of the first time domain resource is the sending time.

5. The method according to claim 1, wherein determining, by the first node, the sending time comprises:
   determining, by the first node, a duration of a timer based on the channel quality parameter value, wherein there is a correspondence between the duration of the timer and the channel quality parameter value; and
   enabling, by the first node, the timer at a first time, and determining the sending time based on the duration of the timer.

6. The method according to claim 1, further comprising:
   receiving, by the first node, the data from a third node, wherein the first node is one of several candidate next-hop nodes of the third node.

7. The method according to claim 1, wherein the channel quality parameter value is at least one of:
   a signal-to-noise ratio (SNR), a value interval of the SNR, a signal to interference plus noise ratio (SINR), a value interval of the SINR, a channel quality indicator (CQI), a value interval of the CQI, a received signal strength indicator (RSSI), a value interval of the RSSI, a reference signal received power (RSRP), or a value interval of the RSRP.

8. An apparatus, comprising:
one or more processors;
a memory coupled to the one or more processors, the memory storing a program to be executed by the one or more processors and including instructions that cause the apparatus to:
measure a quality of a channel between a first node and a second node to determine a channel quality parameter value;
determine, based on the channel quality parameter value, a sending time for starting to send data, wherein the first node is one of several candidate previous-hop nodes of the second node; and
sending the data to the second node, starting at the sending time.

9. The apparatus according to claim 8, wherein there is a correspondence between the channel quality parameter value and the sending time.

10. The apparatus according to claim 8, wherein there is a correspondence between the channel quality parameter value and a time domain offset value that indicates a time domain offset between a start time of a first reference time domain resource and the sending time; and wherein
determining the sending time comprises:
determining the time domain offset value based on the channel quality parameter value; and
determining the sending time based on the time domain offset value and the reference time domain resource.

11. The apparatus according to claim 8, wherein there is a correspondence between the channel quality parameter value and a first time domain resource used to send the data; and
determining the sending time comprises:
determining the first time domain resource based on the channel quality parameter value, wherein a start time of the first time domain resource is the sending time.

12. The apparatus according to claim 8, wherein determining the sending time comprises:
determining a duration of a timer based on the channel quality parameter value, wherein there is a correspondence between the duration of the timer and the channel quality parameter value;
enabling the timer at a first time; and
determining the sending time based on the duration of the timer.

13. The apparatus according to claim 8, wherein the program further includes instructions that when executed by the one or more processors cause the apparatus to:
receive the data from a third node, wherein the first node is one of several candidate next-hop nodes of the third node.

14. The apparatus according to claim 8, wherein the channel quality parameter value is at least one of:
a signal-to-noise ratio (SNR), a value interval of the SNR, a signal to interference plus noise ratio (SINR), a value interval of the SINR, a channel quality indicator (CQI), a value interval of the CQI, a received signal strength indicator (RSSI), a value interval of the RSSI, a reference signal received power (RSRP), or a value interval of the RSRP.

15. A non-transitory computer readable medium comprising: instructions that, when executed by one or more processors of a device, cause the device to:
measure a quality of a channel between a first node and a second node to determine a channel quality parameter value;
determine, based on the channel quality parameter value, a sending time for starting to send data, wherein the first node is one of several candidate previous-hop nodes of the second node; and
send the data to the second node, starting at the sending time.

16. The non-transitory computer readable medium according to claim 15, wherein there is a correspondence between the channel quality parameter value and the sending time.

17. The non-transitory computer readable medium according to claim 15, wherein there is a correspondence between the channel quality parameter value and a time domain offset value that indicates a time domain offset between a start time of a first reference time domain resource and the sending time; and
determining the sending time comprises:
determining the time domain offset value based on the channel quality parameter value; and
determining the sending time based on the time domain offset value and the reference time domain resource.

18. The non-transitory computer readable medium according to claim 15, wherein there is a correspondence between the channel quality parameter value and a first time domain resource used to send the data; and
determining the sending time comprises:
determining the first time domain resource based on the quality of the channel, wherein a start time of the first time domain resource is the sending time.

19. The non-transitory computer readable medium according to claim 15, wherein determining, based on the channel quality parameter value, the sending time, comprises:
determining a duration of a timer based on the channel quality parameter value, wherein there is a correspondence between the duration of the timer and the channel quality parameter value;
enabling the timer at a first time; and
determining the sending time based on the duration of the timer.

20. The non-transitory computer readable medium according to claim 15, wherein the non-transitory computer readable medium further stores instructions that cause the device to:
receive the data from a third node, wherein the first node is one of several candidate next-hop nodes of the third node.

* * * * *